(12) United States Patent
Portelance

(10) Patent No.: US 8,006,798 B2
(45) Date of Patent: Aug. 30, 2011

(54) VEHICLE HAVING A SHIFT LEVER ON A HANDLEBAR THEREOF

(75) Inventor: Martin Portelance, Chicoutimi (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 12/989,761

(22) PCT Filed: Apr. 30, 2008

(86) PCT No.: PCT/US2008/062063
§ 371 (c)(1),
(2), (4) Date: Oct. 26, 2010

(87) PCT Pub. No.: WO2009/134258
PCT Pub. Date: Nov. 5, 2009

(65) Prior Publication Data
US 2011/0042158 A1    Feb. 24, 2011

(51) Int. Cl.
*B60K 20/06* (2006.01)
*B60K 23/02* (2006.01)
*H01H 9/06* (2006.01)
*H01H 3/22* (2006.01)

(52) U.S. Cl. ............... 180/336; 180/333; 200/61.88; 200/61.91

(58) Field of Classification Search ............ 180/336, 180/333; 200/61.85, 61.88, 61.91
See application file for complete search history.

(56) References Cited

U.S. PATENT DOCUMENTS

| | | | | |
|---|---|---|---|---|
| 4,455,463 A | * | 6/1984 | Rohl | 200/61.85 |
| 4,570,078 A | * | 2/1986 | Yashima et al. | 307/10.1 |
| 4,619,154 A | * | 10/1986 | Yamanaka | 74/489 |

(Continued)

FOREIGN PATENT DOCUMENTS

CA    2259778 A1    7/2000
(Continued)

OTHER PUBLICATIONS

International Search Report from PCT/US2008/062063 from J. Bourgoin dated Feb. 5, 2009.

*Primary Examiner* — Eric Culbreth
*Assistant Examiner* — Karen Jane A Beck
(74) *Attorney, Agent, or Firm* — Osler, Hoskin & Harcourt LLP

(57) ABSTRACT

A vehicle (10) has a frame (12), at least two wheels (14, 16), a straddle seat (28), a handlebar (18) having first (20) and second (22) handles, an engine (30), a semi-automatic transmission (32), and a housing (24) disposed adjacent the first handle. A shift lever (108) is pivotally connected to the housing. At least a portion of the shift lever extends away from the handle side of the housing towards an end of the first handle and is disposed at least in part vertically below the first handle. The shift lever has rear (140) and front surfaces (142). The shift lever is movable to an up-shift position by pressing one of the front and rear surfaces, is movable to a down-shift position by pressing a remaining one of the front and rear surfaces, and is biased towards a rest position intermediate the up-shift and down-shift positions. The shift lever is operatively connected to the semi-automatic transmission.

19 Claims, 14 Drawing Sheets

U.S. PATENT DOCUMENTS

| | | | | |
|---|---|---|---|---|
| 6,225,584 B1 * | 5/2001 | Ase et al. | | 200/61.54 |
| 7,819,037 B2 * | 10/2010 | Hiroi et al. | | 74/335 |
| 2007/0051552 A1 * | 3/2007 | Reed | | 180/333 |
| 2007/0199810 A1 * | 8/2007 | Ieda et al. | | 200/61.88 |
| 2010/0059304 A1 * | 3/2010 | Deguchi | | 180/336 |
| 2010/0270135 A1 * | 10/2010 | Murasawa et al. | | 200/61.88 |
| 2010/0307856 A1 * | 12/2010 | Hahn | | 180/333 |

FOREIGN PATENT DOCUMENTS

| | | | |
|---|---|---|---|
| EP | 1323955 A | | 7/2003 |
| EP | 1588931 A | | 10/2005 |
| EP | 1939038 A | | 7/2008 |
| GB | 340315 A | | 12/1930 |
| JP | 2008-062735 | * | 3/2008 |
| WO | 03/099601 A1 | | 12/2003 |

* cited by examiner

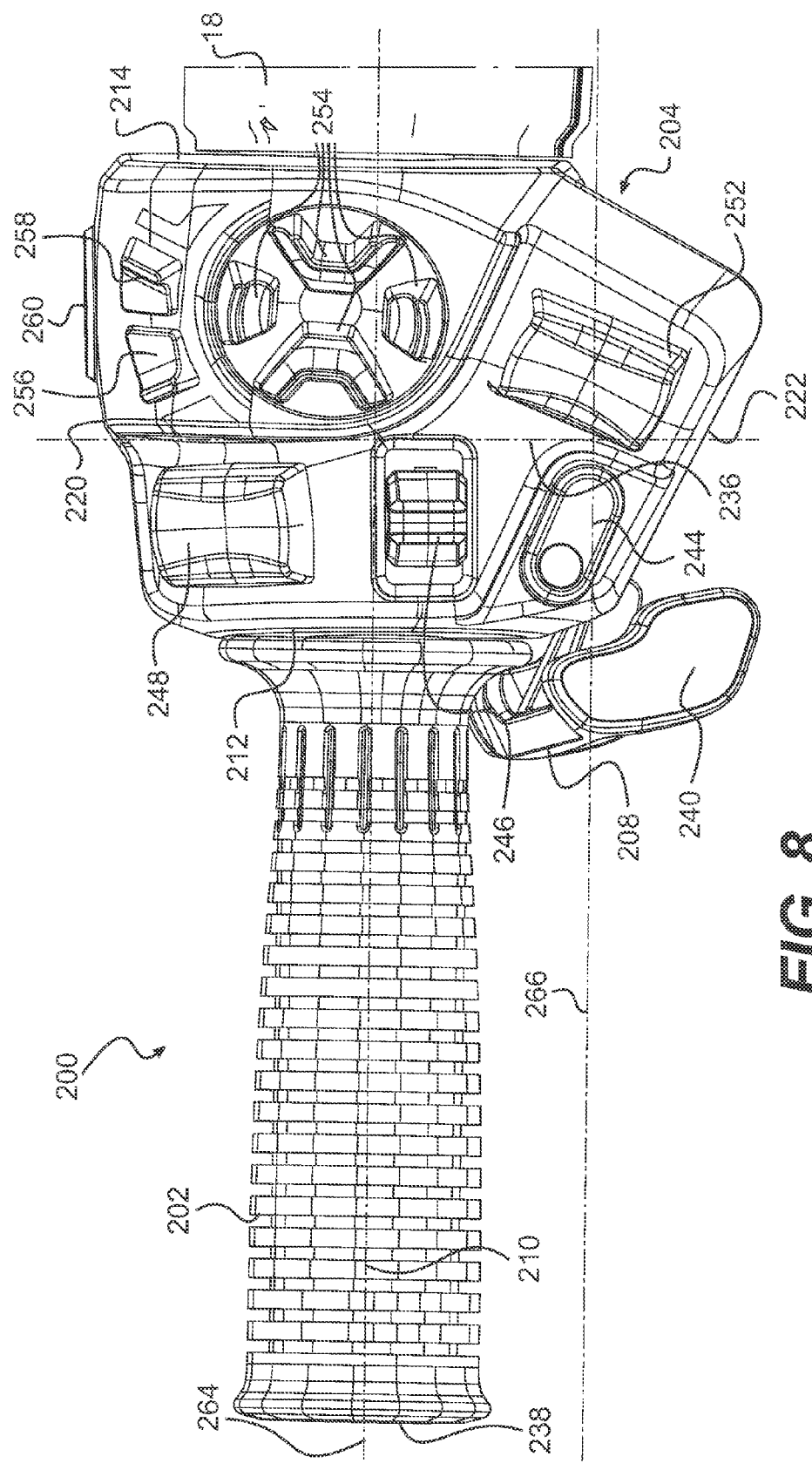

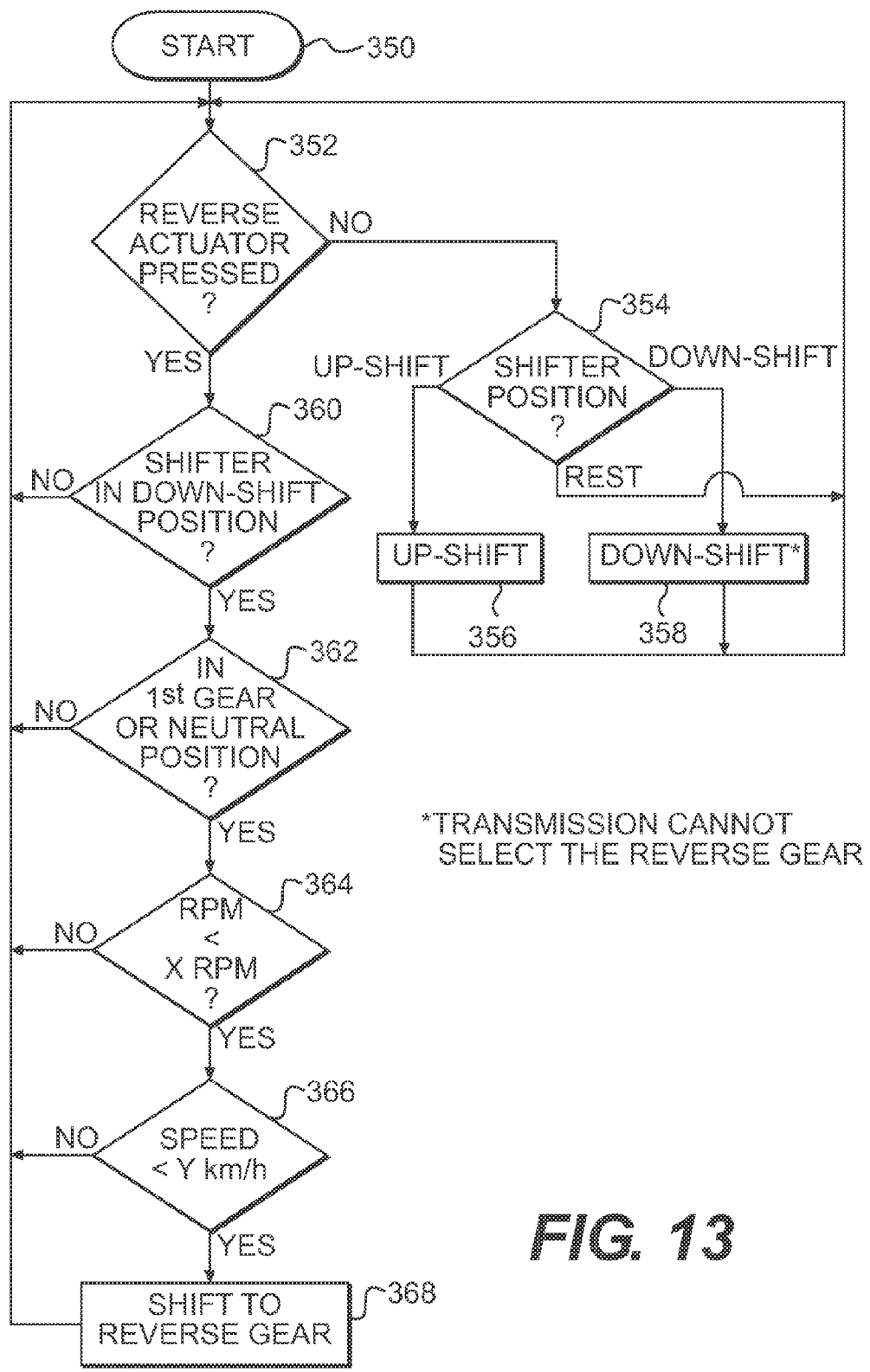

US 8,006,798 B2

VEHICLE HAVING A SHIFT LEVER ON A HANDLEBAR THEREOF

CROSS-REFERENCE

The present application is the United States National Stage of PCT/US2008/062063, filed Apr. 30, 2008, entitled 'Vehicle Having a Shift Lever on a Handlebar Thereof', the entirety of which is incorporated herein by reference.

FIELD OF THE INVENTION

The present invention relates to a vehicle having a shift lever on a handlebar thereof. More specifically, the present invention relates to the positioning of the shift lever.

BACKGROUND OF THE INVENTION

Semi-automatic transmissions are being provided on many vehicles. With a semi-automatic transmission, the driver of the vehicle has control of the transmission by using a shifter with the advantage that the driver does not have to actuate a separate clutch actuator. When the driver actuates the shifter, a signal is sent to a control unit of the transmission which sends signals to cause a clutch connected to the transmission to disengage, to cause the transmission to shift gear once the clutch is disengaged, and to engage the clutch once the transmission has shifted gear. In another type of semi-automatic transmission, when the driver actuates the shifter, a signal is sent to a control unit of the transmission and engine which sends signals to cause the ignition to be cut, thus momentarily reducing engine torque, to cause the transmission to shift gear while ignition is cut, and to resume ignition once the transmission has shifted gear. By electronically controlling these operations, the transmission will consistently be shifted smoothly, which is sometimes not the case when an inexperienced driver has to actuate both a shifter and a clutch actuator in a vehicle equipped with a manual transmission. This also greatly reduces the likelihood of the vehicle stalling because of a failed shifting attempt, which is common when vehicles equipped with manual transmissions are driven by inexperienced drivers.

On vehicles having a handlebar, such as motorcycles and all-terrain vehicles (ATVs), the shifter is sometimes provided on the handlebar near one of the handles. This allows a driver of the vehicle to actuate the shifter by using the fingers of the hand used to hold the handle. If the shifter is not properly positioned, the shifter can be difficult to reach, which can lead to the driver's gripping force on the handle being reduced.

In addition, some vehicles are provided with a housing on the handlebar adjacent the handle near which the shifter is provided. This housing has various switches controlling various features of the vehicle such as the horn or flashing signals. If these switches are not properly positioned on the housing, it can lead to some complicated finger gymnastics for a driver trying to actuate these switches without moving his hand too much on the handle. Furthermore, the shifter and the switches need to be arranged relative to each other so as to provide an easy transition from the switches to the shifter, and vice versa, since the same finger will often be used to actuate both the switches and the shifter.

Therefore, there is a need for a vehicle having a shifter and switch arrangement which allow for easy and comfortable actuation of both the shifter and at least one switch.

SUMMARY OF THE INVENTION

It is an object of the present invention to ameliorate at least some of the inconveniences present in the prior art.

It is also an object of the present invention to provide a vehicle having a shifter disposed near a handle thereof, with a housing having at least one switch thereon being disposed next to the handle. A surface of the shifter to be actuated by a thumb of the driver and the at least one switch are arranged such that they are positioned substantially at the same level relative to a longitudinal centerline of the handle.

In one aspect, the invention provides a vehicle having a frame, at least two wheels connected to the frame, a straddle seat disposed on the frame, and a handlebar disposed at least in part forwardly of the seat. The handlebar is operatively connected to at least one of the at least two wheels for steering the at least one of the at least two wheels. The handlebar has a first handle at a first end thereof and a second handle at a second end thereof. The first handle has a longitudinal centerline. An engine is disposed on the frame. A semi-automatic transmission is operatively connected to the engine and at least one of the at least two wheels for transmitting power from the engine to the at least one of the at least two wheels. A housing is disposed adjacent the first handle. The housing has a rear side generally facing towards a rear of the vehicle. The housing has a handle side generally facing towards the first handle. A switch is disposed on the rear side of the housing. A shift lever is pivotally connected to the housing. At least a portion of the shift lever extends away from the handle side of the housing towards an end of the first handle and is disposed at least in part vertically below the first handle. The shift lever has a rear surface generally facing towards the rear of the vehicle and a front surface generally facing towards the front of the vehicle. The shift lever is movable to an up-shift position by pressing one of the front surface and the rear surface. The shift lever is movable to a down-shift position by pressing a remaining one of the front surface and the rear surface. The shift lever is biased towards a rest position intermediate the up-shift and down-shift positions. The shift lever is operatively connected to the semi-automatic transmission such that moving the shift lever to the up-shift position causes the semi-automatic transmission to shift up and moving the shift lever to the down-shift position causes the semi-automatic transmission to shift down. A first vertically extending plane contains the longitudinal centerline of the first handle. A second plane contains the longitudinal centerline of the first handle and is perpendicular to the first plane. The rear surface of the shift lever and the switch are arranged such that at least one third plane parallel to the second plane intersects both the rear surface of the shift lever and the switch. When the shift lever is in the rest position, a normal projection of the rear surface of the shift lever onto the second plane is disposed between outer edges of a normal projection of the first handle onto the second plane in a direction perpendicular to the longitudinal centerline of the first handle.

In an additional aspect, the housing includes a first housing and a second housing. The first housing is disposed between the second housing and the first handle.

In a further aspect, the switch is disposed on the first housing.

In an additional aspect, the switch is disposed on the second housing.

In a further aspect, the switch is a first switch and the vehicle also has a second switch disposed on the rear side of the second housing. The second switch is arranged such that the at least one third plane intersects the second switch.

In an additional aspect, the switch is a first switch and the vehicle also has a second switch disposed on the rear side of the housing. The second switch is arranged such that the at least one third plane intersects the second switch.

In a further aspect, the switch is one of a push button, a toggle switch, and a sliding switch.

In an additional aspect, the rear surface of the shift lever is generally L-shaped.

In another aspect, the invention provides a vehicle having a frame, at least two wheels connected to the frame, a straddle seat disposed on the frame, and a handlebar disposed at least in part forwardly of the seat. The handlebar is operatively connected to at least one of the at least two wheels for steering the at least one of the at least two wheels. The handlebar has a first handle at a first end thereof and a second handle at a second end thereof. The first handle has a longitudinal centerline. An engine is disposed on the frame. A semi-automatic transmission is operatively connected to the engine and at least one of the at least two wheels for transmitting power from the engine to the at least one of the at least two wheels. A housing is disposed adjacent the first handle. The housing has a rear side generally facing towards a rear of the vehicle. The housing has a handle side generally facing towards the first handle. A switch is disposed on the rear side of the housing. A shift lever is pivotally connected to the housing. At least a portion of the shift lever extends away from the handle side of the housing towards an end of the first handle and is disposed at least in part vertically below the first handle. The shift lever has a rear surface generally facing towards the rear of the vehicle and a front surface generally facing towards the front of the vehicle. The shift lever is movable to an up-shift position by pressing one of the front surface and the rear surface. The shift lever is movable to a down-shift position by pressing a remaining one of the front surface and the rear surface. The shift lever is biased towards a rest position intermediate the up-shift and down-shift positions. The shift lever is operatively connected to the semi-automatic transmission such that moving the shift lever to the up-shift position causes the semi-automatic transmission to shift up and moving the shift lever to the down-shift position causes the semi-automatic transmission to shift down. A first vertically extending plane contains the longitudinal centerline of the first handle. The rear surface of the shift lever and the switch are arranged such that at least one second plane perpendicular to the first plane and parallel to the longitudinal centerline of the first handle intersects both the rear surface of the shift lever and the switch. When the shift lever is in the rest position, a normal projection of the rear surface of the shift lever onto the second plane is disposed between outer edges of a normal projection of the first handle onto the second plane in a direction perpendicular to the longitudinal centerline of the first handle.

In an additional aspect, the housing includes a first housing and a second housing. The first housing is disposed between the second housing and the first handle.

In a further aspect, the switch is disposed on the first housing.

In an additional aspect, the switch is disposed on the second housing.

In a further aspect, the switch is a first switch and the vehicle also has a second switch disposed on the rear side of the second housing. The second switch is arranged such that the at least one second plane intersects the second switch.

In a further aspect, the switch is a first switch and the vehicle also has a second switch disposed on the rear side of the housing. The second switch is arranged such that the at least one second plane intersects the second switch.

In a further aspect, the switch is one of a push button, a toggle switch, and a sliding switch.

In an additional aspect, the rear surface of the shift lever is generally L-shaped.

In yet another aspect, the invention provides a vehicle having a frame, at least two wheels connected to the frame, a straddle seat disposed on the frame, and a handlebar disposed at least in part forwardly of the seat. The handlebar is operatively connected to at least one of the at least two wheels for steering the at least one of the at least two wheels. The handlebar has a first handle at a first end thereof and a second handle at a second end thereof. The first handle has a longitudinal centerline. An engine is disposed on the frame. A semi-automatic transmission is operatively connected to the engine and at least one of the at least two wheels for transmitting power from the engine to the at least one of the at least two wheels. A housing is disposed adjacent the first handle. The housing has a lower surface. The housing having a handle side generally facing towards the first handle. A shift lever is pivotally connected to the housing about a shift lever axis. The shift lever axis is generally perpendicular to the longitudinal centerline of the first handle. At least a portion of the shift lever extends away from the handle side of the housing towards an end of the first handle and is disposed at least in part vertically below the first handle. The shift lever has a rear surface generally facing towards the rear of the vehicle and a front surface generally facing towards the front of the vehicle. At least a portion of the rear surface extends vertically above the lower surface of the housing. The shift lever is movable to an up-shift position by pressing one of the front surface and the rear surface. The shift lever is movable to a down-shift position by pressing a remaining one of the front surface and the rear surface. The shift lever is biased towards a rest position intermediate the up-shift and down-shift positions. The shift lever is operatively connected to the semi-automatic transmission such that moving the shift lever to the up-shift position causes the semi-automatic transmission to shift up and moving the shift lever to the down-shift position causes the semi-automatic transmission to shift down.

In a further aspect, the housing includes a first housing having a lower surface and a second housing having a lower surface. The first housing is disposed between the second housing and the first handle. At least a portion of the rear surface extends vertically above both the lower surfaces of the first and second housings.

In an additional aspect, a first vertically extending plane contains the longitudinal centerline of the first handle. A second plane contains the longitudinal centerline of the first handle and is perpendicular to the first plane. When the shift lever is in the rest position, a normal projection of the rear surface of the shift lever onto the second plane is disposed between outer edges of a normal projection of the first handle onto the second plane in a direction perpendicular to the longitudinal centerline of the first handle.

For purposes of this application, the term "shifter" means any device that can be operated by a driver of the vehicle to select a gear or position of the semi-automatic transmission. A shifter can be in the form of, but is not limited to (unless specifically mentioned otherwise with respect to some embodiments), at least one button, lever, or toggle switch. Also for purposes of this application, the term "switch" means any device that can be used to make, break, or change the condition of an electrical circuit. A switch can be in the form of, but is not limited to, a push button, a toggle switch, and a sliding switch. Also, terms related to spatial orientation such as front and rear are as they would normally be understood by a driver of the vehicle sitting on the vehicle in a normal driving position with the vehicle on a horizontally level surface.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention will be described with respect to a three-wheeled vehicle having a handlebar for steering. However it should be understood that the invention could be used in other wheeled vehicles having a handlebar for steering such as but, not limited to, a motorcycle, a scooter, and an all-terrain vehicle (ATV). U.S. Pat. No. 6,732,830, issued May 11, 2004, the entirety of which is incorporated herein by reference, describes the general features of an ATV.

Figure 1:
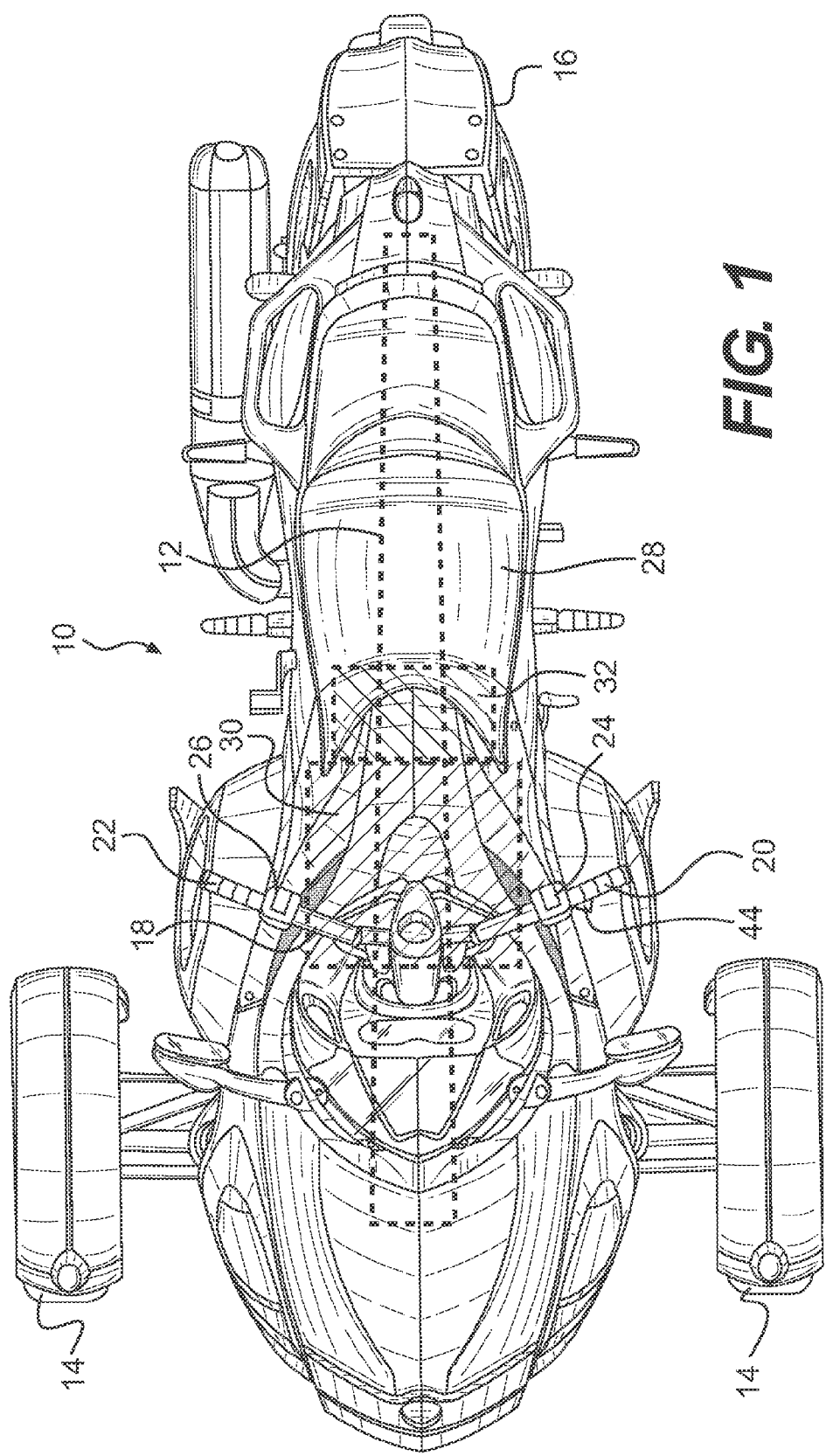
FIG. 1 is a top view of a three-wheeled vehicle in accordance with the present invention.

As shown in FIG. 1, a three-wheeled vehicle 10 has a frame 12 (shown schematically) to which two front wheels 14 and one rear wheel 16 are connected. A handlebar 18 is connected to the two front wheels 14 for steering the two front wheels 14. The handlebar 18 has a left handle 20 and a right handle 22 disposed at the ends of the handlebar 18. At least one left housing 24 and at least one right housing 26 are disposed adjacent their respective handles 20, 22. The handles 20, 22 and housings 24, 26 will be described in greater detail below. The handlebar 18 is disposed forwardly of a straddle seat 28 which is supported by the frame 12. An engine 30 (shown schematically) is disposed on the frame 12 vertically below the seat 28. A semi-automatic transmission 32 (shown schematically) is operatively connected to the engine 30 and the rear wheel 16 to transmit power from the engine 30 to the rear wheel 16. The semi-automatic transmission 32 will be described in greater detail below. United States Patent Application Publication No. 2008/0023242 A1, published Jan. 31, 2008, the entirety of which is incorporated herein by reference, describes additional features of a three-wheeled vehicle similar to the three-wheeled vehicle 10.

Figure 2A:
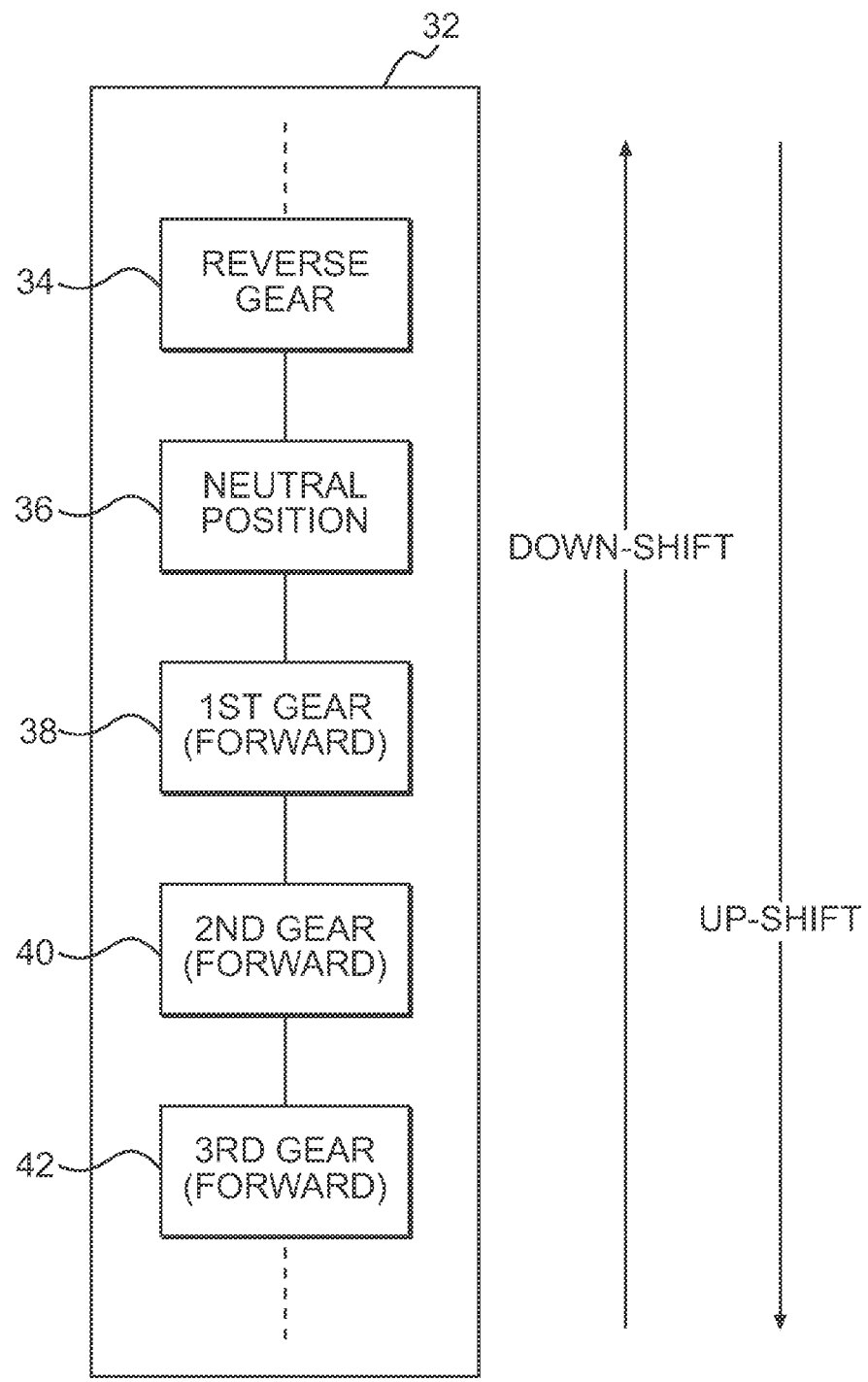
FIG. 2A is a schematic representation of a gear sequence of a semi-automatic transmission of the vehicle of FIG. 1.

As seen in FIG. 2A, the semi-automatic transmission 32 has a reverse gear 34, a neutral position 36, a first forward gear 38, a second forward gear 40, and a third forward gear 42. When the reverse gear 34 is selected by the semi-automatic transmission 32, the semi-automatic transmission 32 allows the vehicle 10 to move in a reverse direction. When one of the forward gears 38, 40, and 42 is selected by the semi-automatic transmission 32, the semi-automatic transmission 32 allows the vehicle 10 to move in a forward direction. When the neutral position 36 is selected by the semi-automatic transmission 32, no power is transmitted from the engine 30 to the rear wheel 16 by the semi-automatic transmission 32. It is contemplated that the semi-automatic transmission 32 could have more than one reverse gear 34 and more or fewer than three forward gears 38, 40, and 42.

Figure 12:
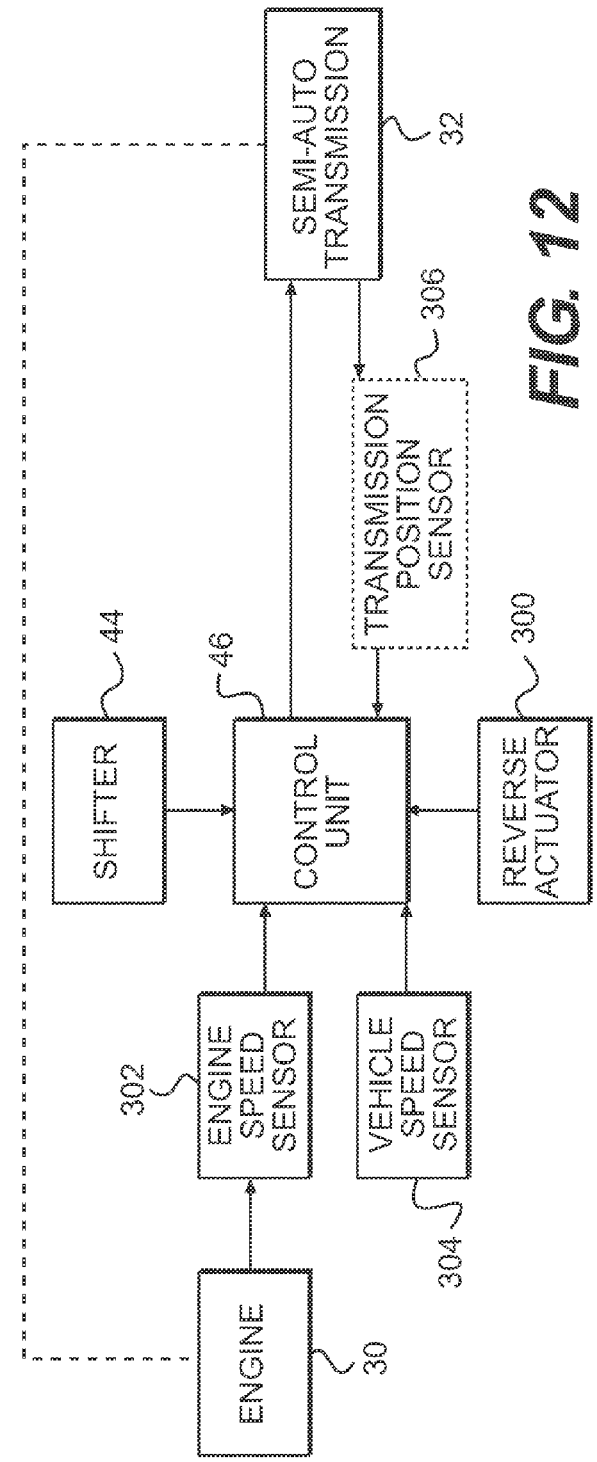
FIG. 12 is a schematic representation of inputs and outputs of a control unit of the semi-automatic transmission of the vehicle of FIG. 1.

To allow a driver of the vehicle 10 to select a desired gear 34, 38, 40, or 42 or the neutral position 36, at least one shifter 44 (FIG. 1) is disposed near the left handle 20. For simplicity, the at least one shifter 44 will be referred to as shifter 44 below, however it should be understood that for at least some embodiments, there could be more than one shifter 44. It is contemplated that the shifter 44 could be provided near the right handle 22 instead. As seen in FIG. 12, the shifter 44 is electronically connected to a control unit 46 of the semi-automatic transmission 32. The control unit 46 is electronically connected to the semi-automatic transmission 32, such that, unless as specifically provided below, when a signal from the shifter 44 to the control unit 46 is indicative of a desire to shift gear or position, the control unit 46 sends a signal to the semi-automatic transmission 32 to shift gear or position. The shifter 44 has an up-shift position, a down-shift position, and is biased towards a rest position. In the case where only a single shift lever is provided, the rest position of the shifter 44 is intermediate the up-shift and down-shift positions. When the driver of the vehicle 10 moves the shifter 44 to its up-shift position, the electronic control unit 46 sends a signal to the semi-automatic transmission 46 to shift up and therefore select the next gear or position in the sequence of gears/position in the direction indicated by the arrow labeled "up-shift" in FIG. 2A. For example, if the reverse gear 34 is selected and the driver moves the shifter 44 to its up-shift position, the semi-automatic transmission will shift-up to select the neutral position 36. When a driver of the vehicle 10 moves the shifter 44 to its down-shift position, the electronic control unit 46 sends a signal to the semi-automatic transmission 46 to shift down and therefore select the next gear or position in the sequence of gears/positions in the direction indicated by the arrow labeled "down-shift" in FIG. 2A. For example, if the second forward gear 40 is selected and the driver moves the shifter 44 to its down-shift position, the semi-automatic transmission will shift-down to select the first forward gear 38. As described below, it is contemplated that under certain conditions the neutral position 36 could be skipped from the sequence and that the semi-automatic transmission 32 would select the first forward gear 38 when upshifting from the reverse gear 34 and select the reverse gear 34 when down-shifting from the first forward gear 38.

Additional details regarding the construction of a semi-automatic transmission may be found in U.S. Pat. Nos. 6,257,081, issued Jul. 10, 2001, 6,524,224, issued Feb. 25, 2003, and 6,564,663, issued May 20, 2003, the entirety of each of which is incorporated herein by reference, which disclose exemplary embodiments of semi-automatic transmissions. Although the semi-automatic transmissions in these patents do not have a reverse gear 34, as would be understood by those skilled in the art of transmissions, gears could be added (one of which would be reverse gear 34) which, when selected, would cause an output shaft (not shown) of the semi-automatic transmission 32 to rotate in a direction which would cause the vehicle 10 to move in a reverse direction.

Figure 2B:
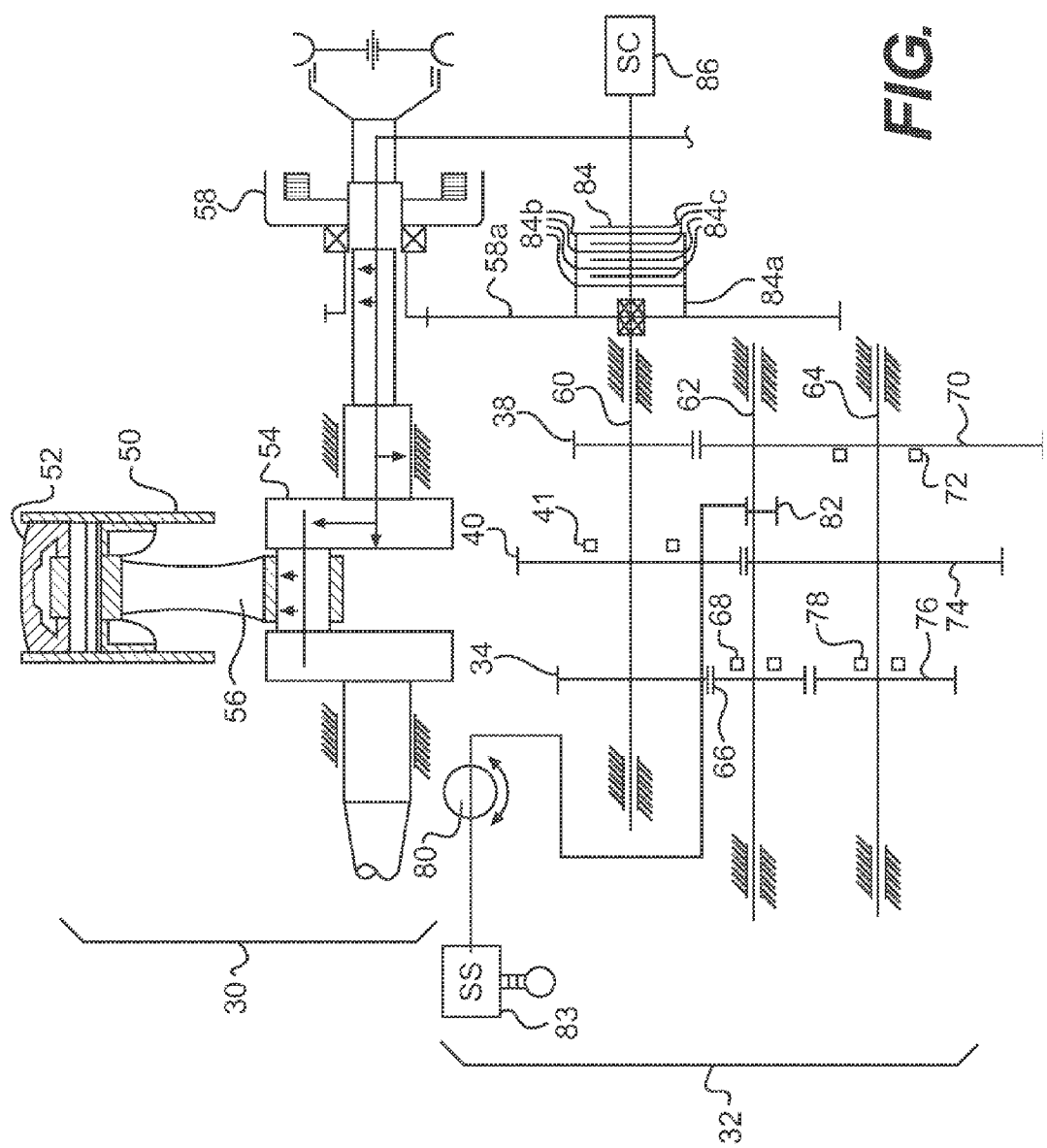
FIG. 2B is a schematic representation of the engine and an alternative embodiment of the semi-automatic transmission of the vehicle of FIG. 1.

FIG. 2B described below schematically illustrates the engine 30 and one contemplated embodiment of a semi-automatic transmission 32 having a reverse gear 34. In the embodiment illustrated in this figure, the semi-automatic transmission 32 has a reverse gear 34, a neutral position 36 (corresponding to the gear arrangement being shown), a first gear 38, and a second gear 40. As seen in FIG. 2B, the engine 30 has a cylinder 50, a piston 52 slidably mounted in cylinder 50, a crankshaft 54 and a connecting rod 56 interconnecting piston 52 and crankshaft 54. A centrifugal starting clutch 58 is mounted one end of the crankshaft 56. In this embodiment, the semi-automatic transmission 32 is integrated with the engine 30 wherein a casing (not shown) serves both as a crankcase for the engine 30 and a transmission case for the semi-automatic transmission 32. The semi-automatic transmission 32 has a main shaft 60, a secondary shaft 62, and an output shaft 64. The first gear 38 is splined on the main shaft 60. The second gear 40 is mounted on a bearing 41 on the main shaft 60. The reverse gear 34 is fixedly mounted on the main shaft 34. An intermediate gear 66 is mounted on a bearing 68 on the secondary shaft 62 and meshes with the reverse gear 34. A first output gear 70 is mounted on a bearing 72 on the output shaft 64 and is selectively meshed with the first gear 38. A second output gear 74 is splined on the output shaft 64 and selectively meshes with the second gear 40. A third output gear 76 is mounted on a bearing 78 on the output shaft 64 and meshes with the intermediate gear 66. A shift drum 80 is connected to shift forks 82. The shift forks 82 are operated for changing the gears of the semi-automatic transmission 32 by moving the gears 38 and 74 along their respective shafts 60 and 64 as described below. A solenoid actuator 83 is connected to the shift drum 80 to operate the shift forks 82. A multiple disk transmission clutch 84 is mounted on one end of main shaft 60.

The engine 30 must have a certain minimum speed before it can run on its own power and develop a sufficiently high torque to drive the vehicle 10. Thus, to prevent power from being transmitted from the crankshaft 54 to the transmission clutch 84 at low rotating speeds, the centrifugal clutch 58 remains disengaged. When the operator increases the speed of the engine 30, the centrifugal clutch 58 is engaged automatically. As the rotational speed of crankshaft 54 increases, the output torque of crankshaft 54 is transmitted through the centrifugal clutch 58 and the transmission clutch 84 to the main shaft 60. The clutch 84 is coupled with a gear 58a in a conventional manner. The gear 58a is connected to a clutch wall 84a that rotates with the gear 58a and at least one of a plurality of plates 84b of the clutch 84. At least one of a plurality of plates 84c of the clutch 84 is fixedly coupled to the main shaft 60. The plates 84b and 84c are axially movable between frictionally engaged positions and non-engaged positions. Coupling of the plates 84b and 84c controls rotation of main shaft 60. A solenoid actuator 86 is used to couple and disconnect the plates 84b and 84c.

When the driver of the vehicle 10 moves the shifter 44 to one of the up-shift position and the down-shift position, the control unit 46 sends a signal to the solenoid actuator 86 to disengage the transmission clutch 84 and sends a signal to the solenoid actuator 83 to cause the shift forks 82 to move the gears 38 and 74 to the desired configuration (described below) while the transmission clutch 84 is disengaged. Once the gears 38 and 74 are in the desired configuration, the control unit 46 sends a signal to the solenoid actuator 86 to engage the transmission clutch 84.

The configuration of the gears of the semi-automatic transmission 32 shown in FIG. 2B corresponds to the neutral position 36. As can be seen, in the neutral position 36, the every gear which rotates with the input and output shafts 60 and 64 (i.e. gears 34, 38, and 74) is meshed with a gear that rotates about the input and output shafts 60 and 64 (i.e. gears 40, 70, and 76), thus no power is transmitted from the input shaft 60 to the output shaft 64. To select the first gear 38 (i.e. to transmit power from the input shaft 60 to the output shaft 64 using the first gear 38), the shift forks 82 are used to move the first gear 38 in the position shown in FIG. 2B (if not already in this position) and to move the second output gear 74 such that it engages the first output gear 70, thereby causing the first output gear 70 to rotate with the output shaft 64. To select the second gear 40 (i.e. to transmit power from the input shaft 60 to the output shaft 64 using the second gear 40), the shift forks 82 are used to move the second output gear 74 in the position shown in FIG. 2B and to move the first gear 38 such that it engages the second gear 40, thereby causing the second gear 40 to rotate with the input shaft 60. To select the reverse gear 34 (i.e. to transmit power from the input shaft 60 to the output shaft 64 using the reverse gear 34), the shift forks 82 are used to move the second output gear 74 such that it engages the third output gear 76, thereby causing the third output gear 76 to rotate with the output shaft 64. As would be understood, when the reverse gear 34 is selected, the intermediate gear 66 disposed between the reverse gear 34 and the third output gear 76 causes the output shaft 64 to rotate in a direction opposite a direction of rotation of the output shaft 64 when the first or second gear 38, 40 is selected.

Turning now to FIGS. 3 to 11, embodiments of handle and housing arrangements will be described. In order to differentiate one embodiment from another, some of the features previously mentioned above when describing the vehicle 10 will now be given new reference numbers in each embodiment.

FIGS. 3 to 6 illustrate an embodiment of a handle and housing arrangement 100. The arrangement 100 includes a left handle 102, a first housing 104, a second housing 106, a shifter in the form of shift lever 108, and various switches disposed on the housings 104, 106 (described below). It is contemplated that the arrangement 100 could be provided on the other end of the handlebar 18, and as a result would include a right handle instead of the left handle 102. It is also contemplated that the first and second housings 104, 106 could be a single housing.

The handle 102 is preferably made of an elastomeric material and has indentations along its length in order to improve gripping of the handle 102. The handle 102 defines a longitudinal centerline 110 passing through a center thereof in a longitudinal direction.

Figure 3:
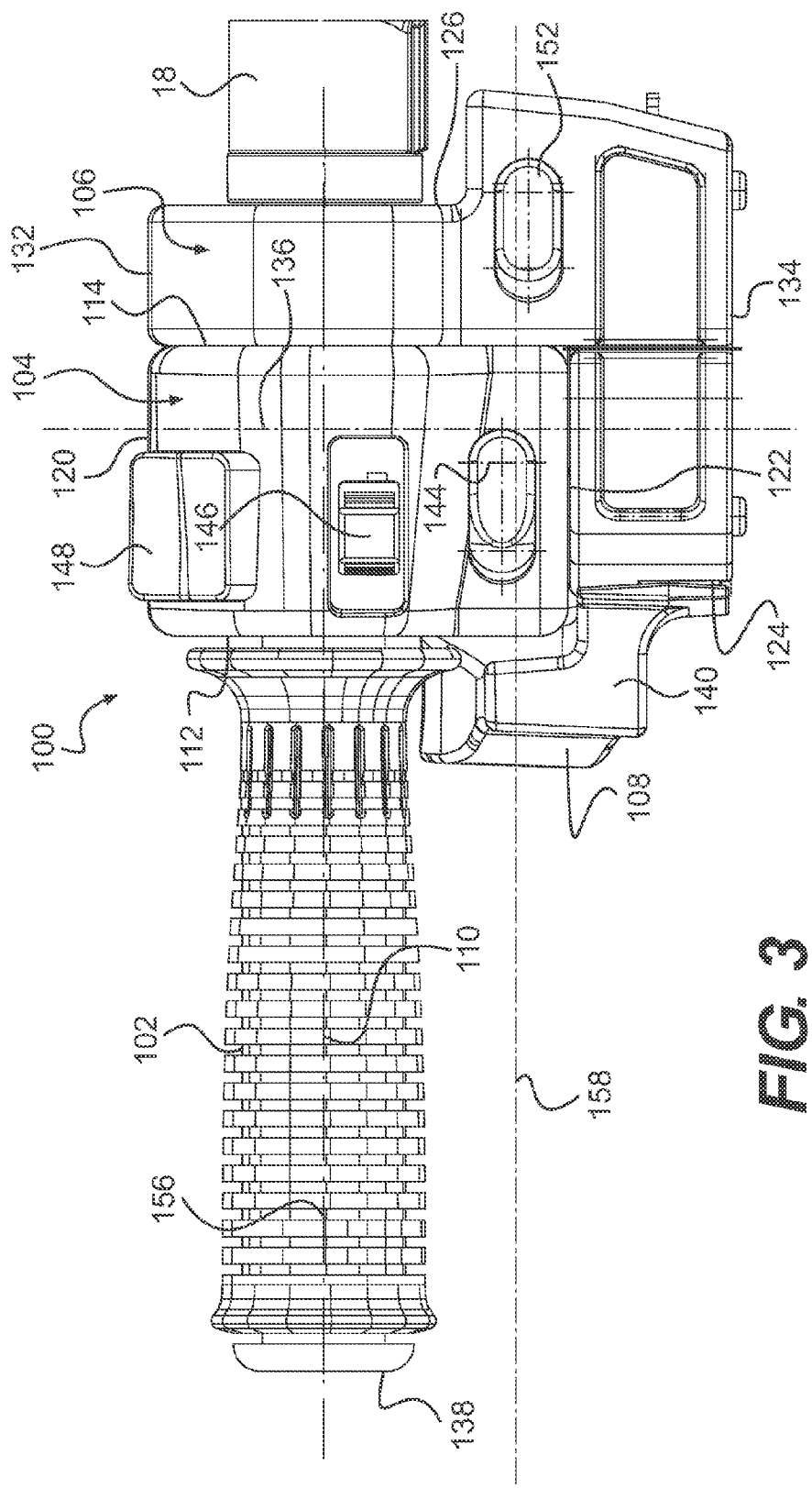
FIG. 3 is a rear elevation view of a handle and housing arrangement of the vehicle of FIG. 1.
Figure 4:
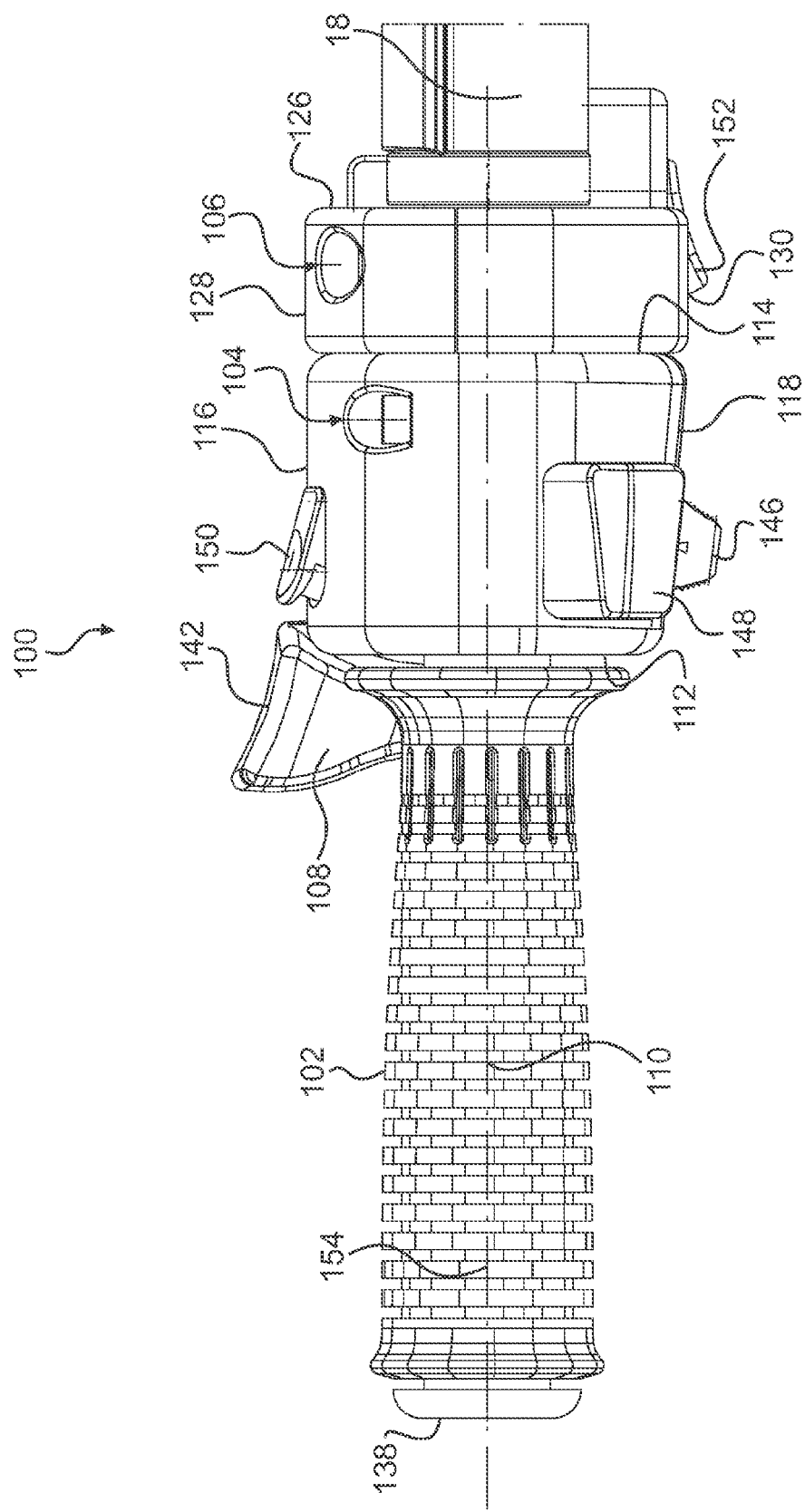
FIG. 4 is a top plan view of the arrangement of FIG. 3.

The first housing 104 is disposed between the second housing 106 and the handle 102. The first housing 104 has a left side 112 (the handle side), a right side 114, a front side 116, a rear side 118, an upper surface 120, and a lower surface 122. The front and rear sides 116, 118 face generally towards a front and a rear of the vehicle 10 respectively when disposed on the handlebar 18 as shown in FIG. 1. As can be seen in FIG. 3, the right side 114 and the lower surface 122 of the first housing 104 abut the second housing 106 which is generally L-shaped. The second housing 106 has a left side 124 (the handle side), a right side 126, a front side 128, a rear side 130, an upper surface 132, and a lower surface 134. The front and rear sides 128, 130 face generally towards the front and the rear of the vehicle 10 respectively when disposed on the handlebar 18 as shown in FIG. 1.

Figure 5:
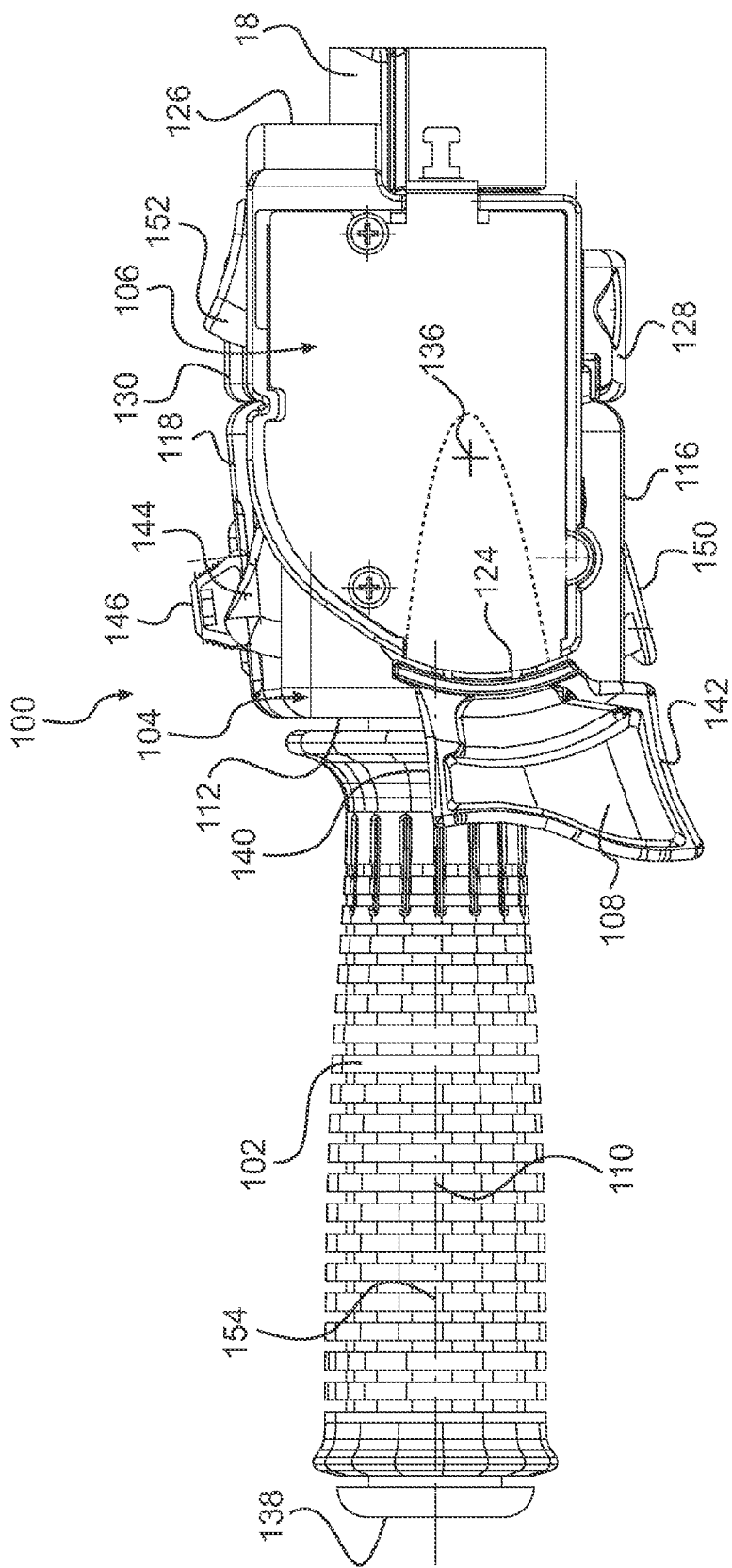
FIG. 5 is a bottom plan view of the arrangement of FIG. 3.

The shift lever 108 is pivotally connected to the second housing 106 about shift lever axis 136 (FIG. 5). As can be seen in FIG. 3, the shift lever axis 136 is generally perpendicular to the longitudinal centerline 110 of the handle 102. As can also be seen in FIG. 3, the shift lever 108 extends away from the left side 124 of the second housing 106 toward the end 138 of the handle 102 and is disposed at least in part vertically below the handle 102. The shift lever 108 has a rear surface 140 adapted to be pressed by a thumb of a driver of the vehicle 10 and a front surface 142 adapted to be pressed by an index finger of the driver (although other fingers may be used). When the shift lever 108 is in the rest position as shown, the rear and front surfaces 140, 142 face generally towards the rear and the front of the vehicle 10 respectively when disposed on the handlebar 18 as shown in FIG. 1. As seen in FIG. 3, the rear surface 140 is generally L-shaped. As also seen in FIG. 3, a portion of the rear surface 140 extends vertically above the lower surface 122 of the first housing 104 (and therefore above the lower surface 134 of the second housing 106). This positions the rear surface 140 in a location where it can be easily pressed by a thumb of the driver.

In a preferred embodiment, pressing the rear surface 140 of the shift lever 108 towards the front of the vehicle 10 moves the shift lever 108 to the up-shift position and pressing the front surface 142 of the shift lever 108 towards the rear of the vehicle 10 moves the shift lever 108 to the down-shift position. It is contemplated, however, that pressing the rear surface 140 could alternatively move the shift lever 108 to the down-shift position and that pressing the front surface 142 would move the shift lever 108 to the up-shift position.

A push button 144 is provided on the rear side 118 of the first housing 104. Pushing the push button 144 actuates a horn of the vehicle 10. A sliding switch 146 is provided on the rear side 118 of the first housing 104 vertically above the push button 144. Sliding the sliding switch 146 to the left actuates a left turn signal of the vehicle 10. Similarly, sliding the sliding switch 146 to the right actuates a right turn signal of the vehicle 10. A toggle switch 148 is disposed near an upper surface 120 of the first housing 104. The toggle switch 148 is used to control the headlights of the vehicle 10. The toggle switch 148 has three positions. In the first position, the headlights are turned on in a low beam mode. In the second position, the headlights are turned on in a high beam mode which provides more light than in the low beam mode. In the third position, the headlights are turned on momentarily to the high beam mode and returns to the low beam mode since the third position of the switch 148 is biased towards the second position. A push button 150 is provided on the front side 116 of the first housing 104. If the helmet of the driver is equipped with a radio-communication device which is connected to the vehicle 10, pushing the push button 150 allows the driver of the vehicle 10 to communicate with drivers of other vehicles equipped with similar radio-communication devices.

By positioning the push button 144, the sliding switch 146, the toggle switch 148, and the push button 150 on the first housing 104 near the left handle 102, they can be easily reached by the fingers of the left hand of the driver.

A push button 152 is disposed on the rear side 130 of the second housing 106. The push button 152 is a reverse actuator which, as described in greater detail below, needs to be pushed while the shift lever 108 is moved in order for the reverse gear 34 to be selected by the semi-automatic transmission 32. As discussed below, the reverse gear 34 can preferably only be engaged at low vehicle speeds. By locating the push button 152 as shown, the push button 152 is sufficiently distanced from the left handle 102 such that the shift lever 108 cannot be moved and the push button 152 pushed simultaneously by using the fingers of the left hand only. Therefore, the driver has to remove his right hand from the right handle 22 and use a finger of the right hand to push the push button 152 while the finger(s) of the left hand are used to move the shifter 108. By forcing the driver to release the right handle 22 to push the push button 152, the driver also releases the throttle actuator of the vehicle 10 which eventually reduces the speed of the vehicle 10 below the desired level at which the reverse gear 34 can be selected.

Figure 6:
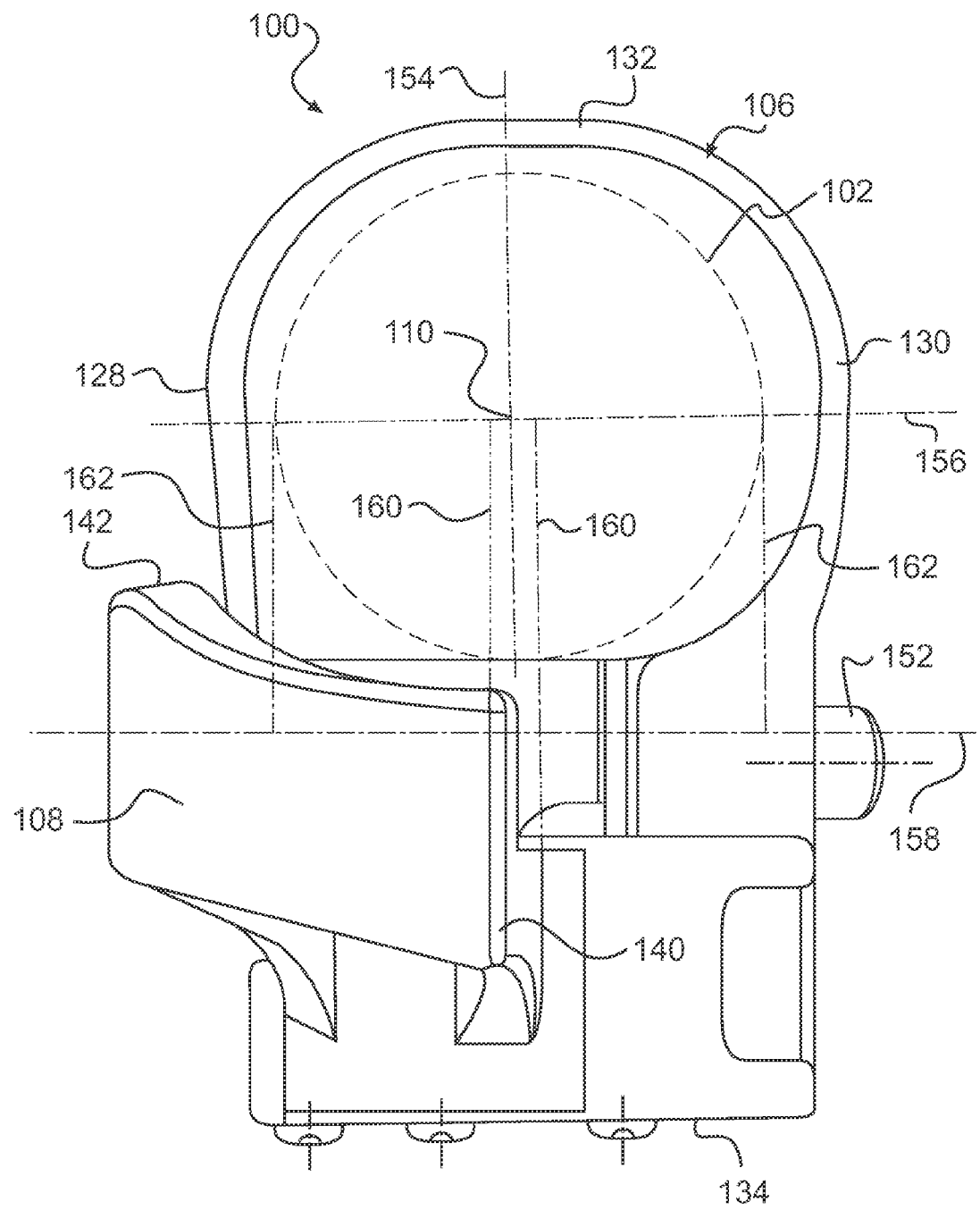
FIG. 6 is an a left side elevation view of a second housing and shifter of the arrangement of FIG. 3.

As best seen in FIG. 6, a vertically extending plane 154 contains the longitudinal centerline 110 of the handle 102, and a plane 156 is perpendicular to the vertically extending plane 154 and also contains the longitudinal centerline 110 of the handle 102. The rear surface 140 of the shift lever 108, the push button 144, and the push button 152 are arranged such that a plane 158 exists that is parallel to the plane 156 (and is therefore parallel to the longitudinal centerline 110) and is perpendicular to the vertically extending plane 154 which intersects rear surface 140 of the shift lever 108, the push button 144, and the push button 152. It is contemplated that push buttons 144 and 152 could be a different type of switch (a toggle switch or a sliding switch for example) and/or could have different functions than the ones described above.

As best seen in FIGS. 5 and 6, when the shift lever 108 is in its rest position as shown, the rear surface 140 of the shift lever 108 does not extend forwardly or rearwardly of the handle 102. As seen in FIG. 6, a normal projection of the rear surface 140 onto either one of planes 156 and 158 (corresponding to the portion of planes 156 and 158 disposed between the lines 160) is disposed between the outer edges of a normal projection of the handle 102 onto a corresponding one of the planes 156 and 158 (corresponding to the portion of planes 156 and 158 disposed between the lines 162) in a direction perpendicular to the longitudinal centerline 110 of the handle 102. By positioning the rear surface 140 of the shift lever 108 and the push button 144 as shown, the rear surface 140 and the push button 144 can easily be reached by a thumb of the driver of the vehicle 10 while still maintaining a firm grip of the handle 102. Transition from one of the rear surface 140 and the push button 144 to the other one of the rear surface 140 and the push button 144 is also facilitated.

Figure 7:
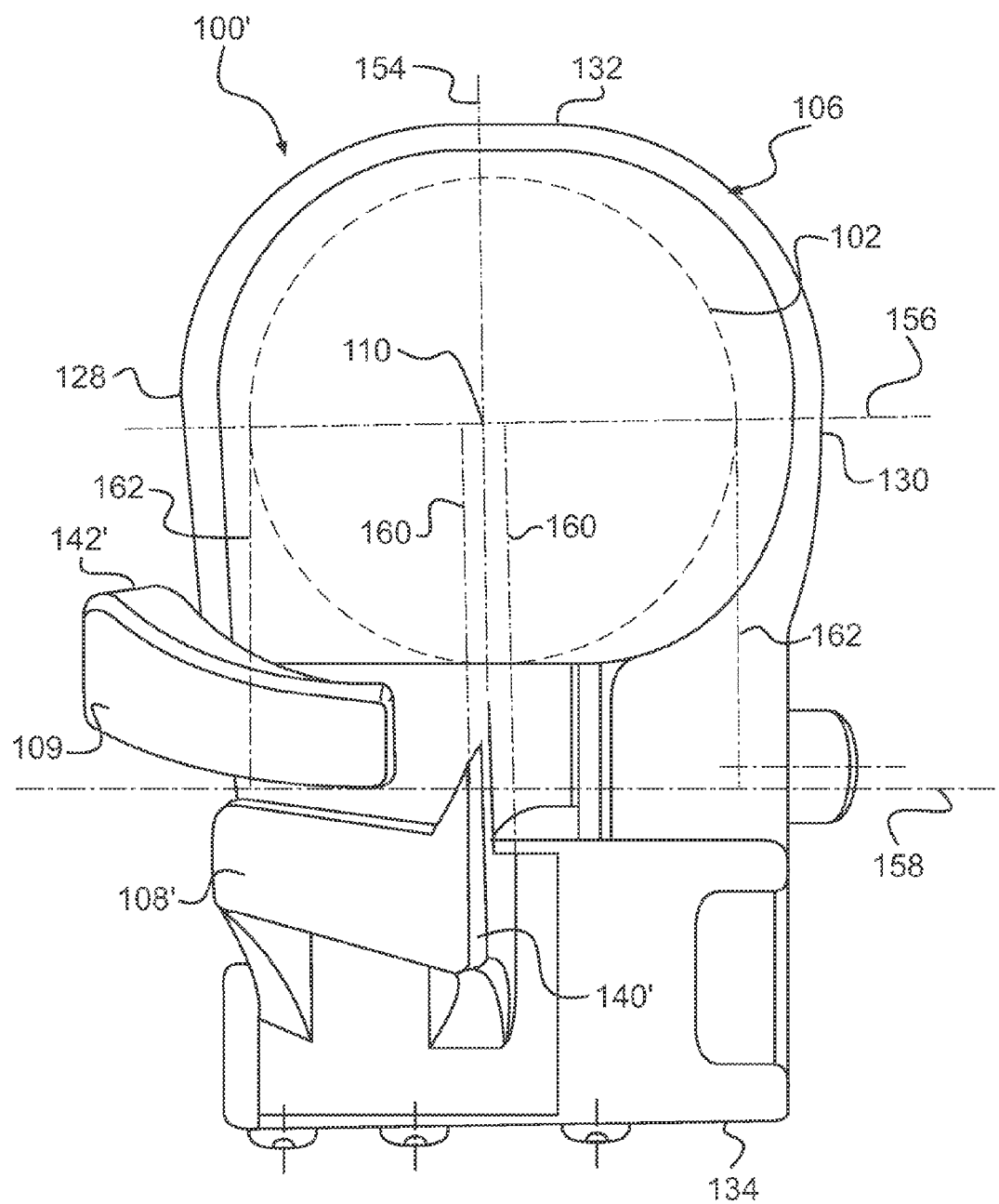
FIG. 7 is an a left side elevation view of the second housing of the arrangement of FIG. 3 having two shifters.

Turning now to FIG. 7, an alternative embodiment of the at least one shifter 44 will be described. For simplicity, features and elements of the handle and housing arrangement 100' shown in FIG. 7 which are similar to those shown in the handle and housing arrangement 100 described above with respect to FIGS. 3 to 6 have been given the same reference numerals and will not be described again in detail.

In the embodiment shown in FIG. 7, the at least one shifter 44 includes two shift levers 108' and 109 pivotally connected to the housing 106. The shift levers 108' and 109 are disposed at least in part vertically below the handle 102. The shift lever 108' has a rear surface 140' adapted to be pressed by a thumb of a driver of the vehicle 10. The shift lever 109 has a front surface 142' adapted to be pressed by an index finger of the driver (although other fingers may be used). When the shift lever 108' is in the rest position as shown, the rear surface 140' faces generally towards the rear of the vehicle 10 when disposed on the handlebar 18 as shown in FIG. 1. When the shift lever 109 is in the rest position as shown, the front surface 142' faces generally towards the front of the vehicle 10 when disposed on the handlebar 18 as shown in FIG. 1. The rear surface 140' extends vertically above the lower surface 134 of the second housing 106. This positions the rear surface 140' in a location where it can be easily pressed by a thumb of the driver.

In a preferred embodiment, pressing the rear surface 140' of the shift lever 108' towards the front of the vehicle 10 moves the shift lever 108' to the up-shift position and pressing the front surface 142' of the shift lever 109 towards the rear of the vehicle 10 moves the shift lever 109 to the down-shift position. It is contemplated, however, that pressing the rear surface 140' could alternatively move the shift lever 108 to the down-shift position and that pressing the front surface 142' would move the shift lever 109 to the up-shift position.

Figure 9:
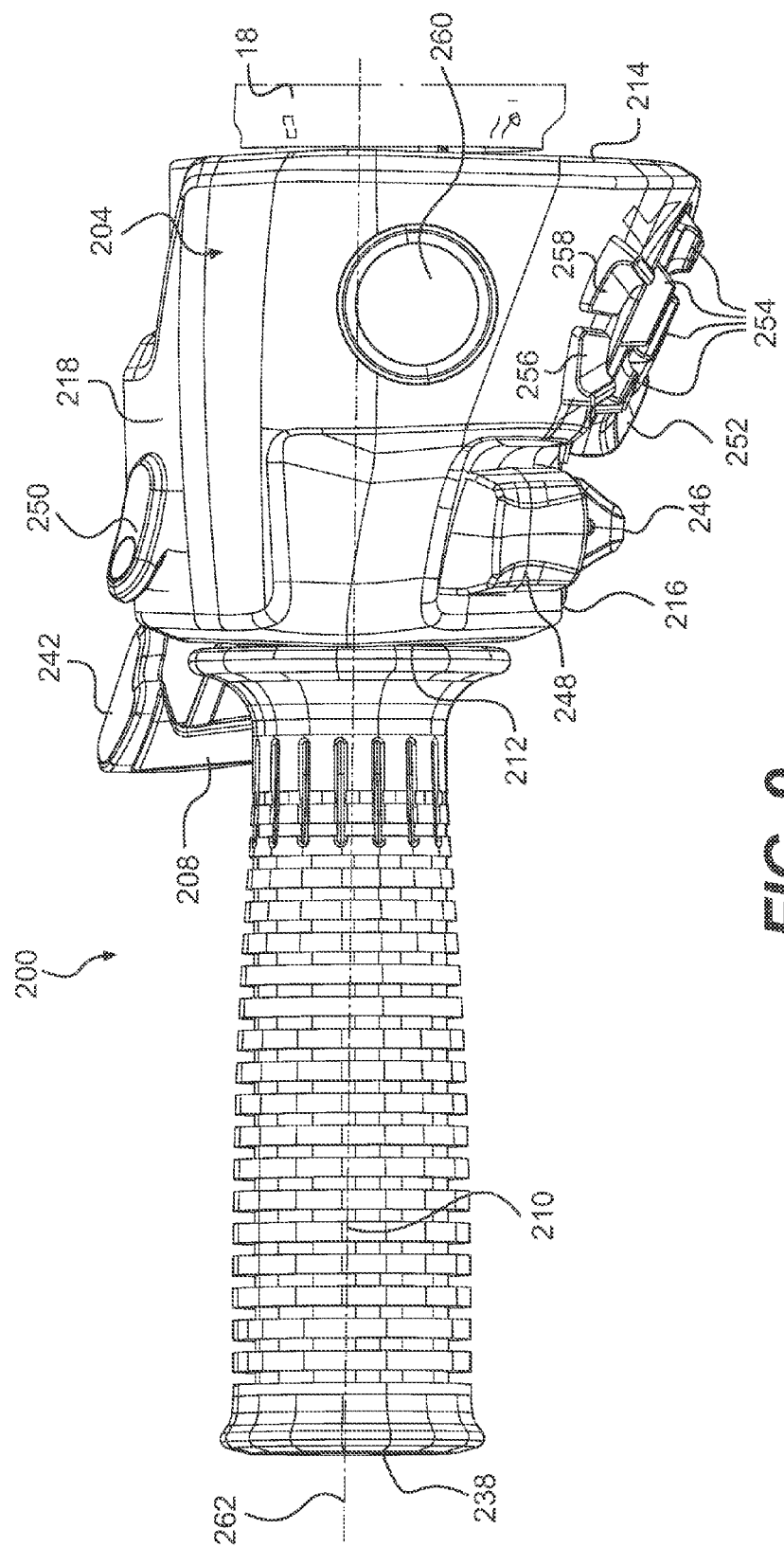
FIG. 9 is a top plan view of the arrangement of FIG. 8.
Figure 10:
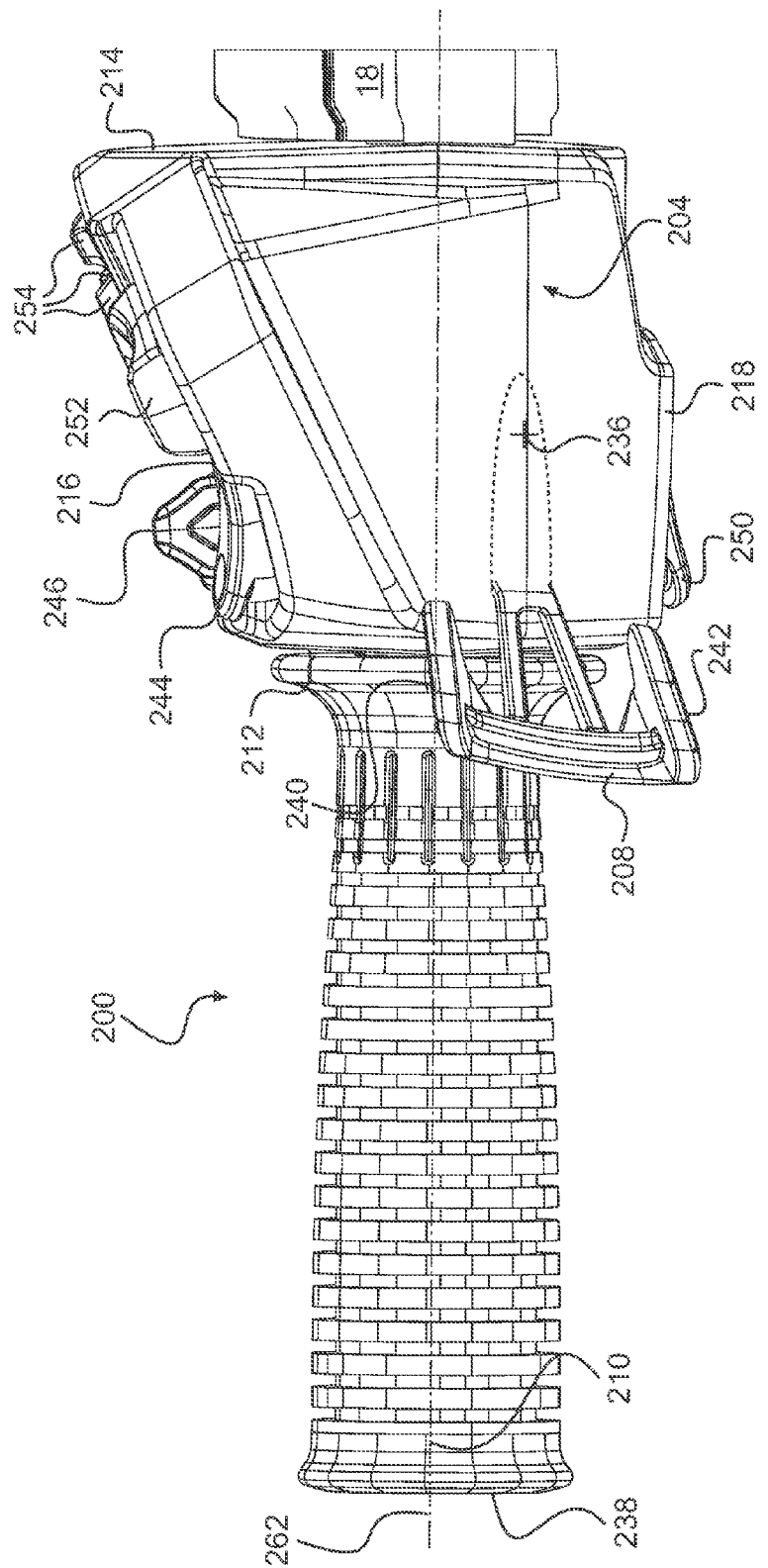
FIG. 10 is a bottom plan view of the arrangement of FIG. 8.
Figure 8:
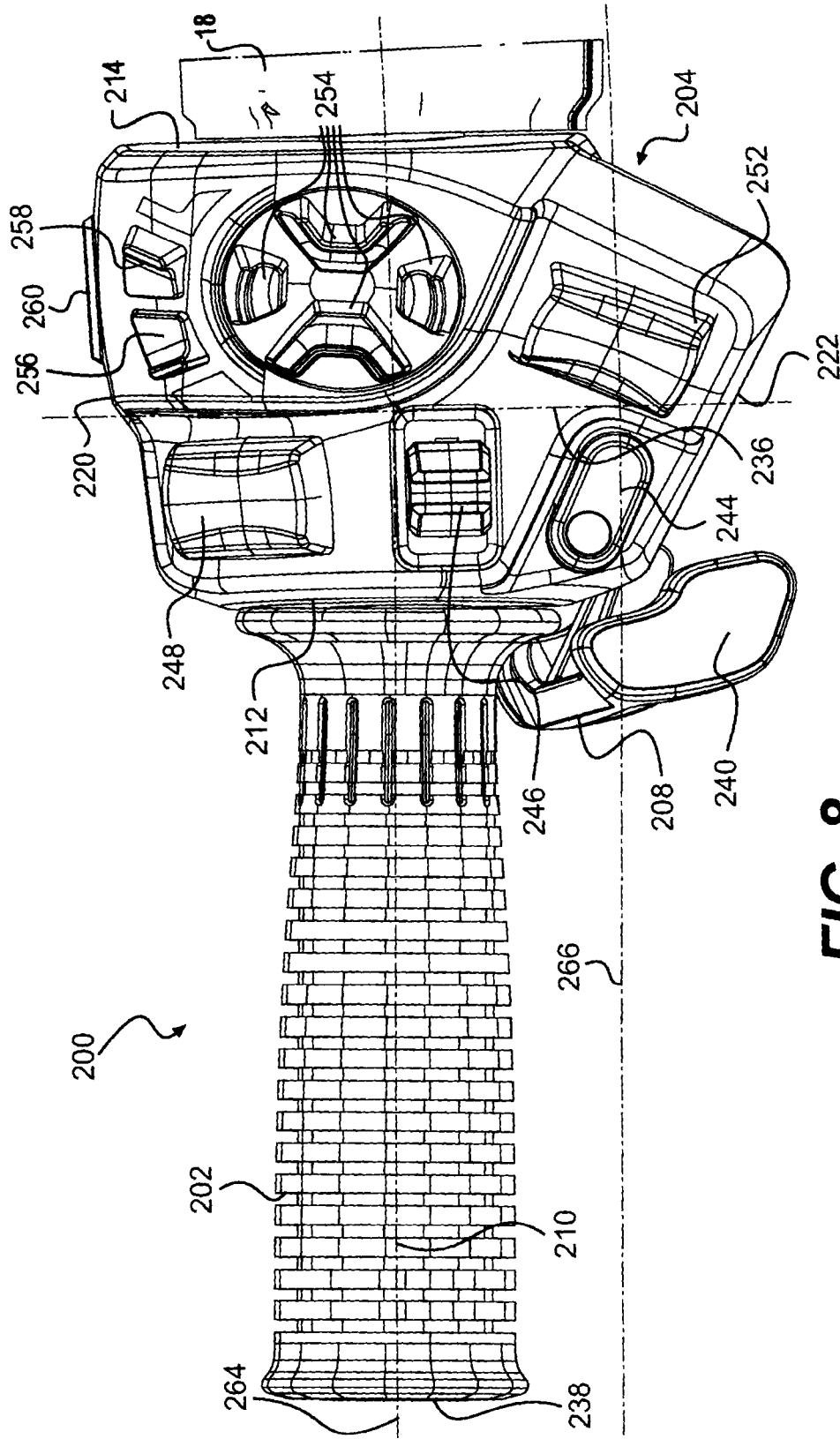
FIG. 8 is a rear elevation view of an alternative embodiment of a handle and housing arrangement of the vehicle of FIG. 1.
Figure 9:
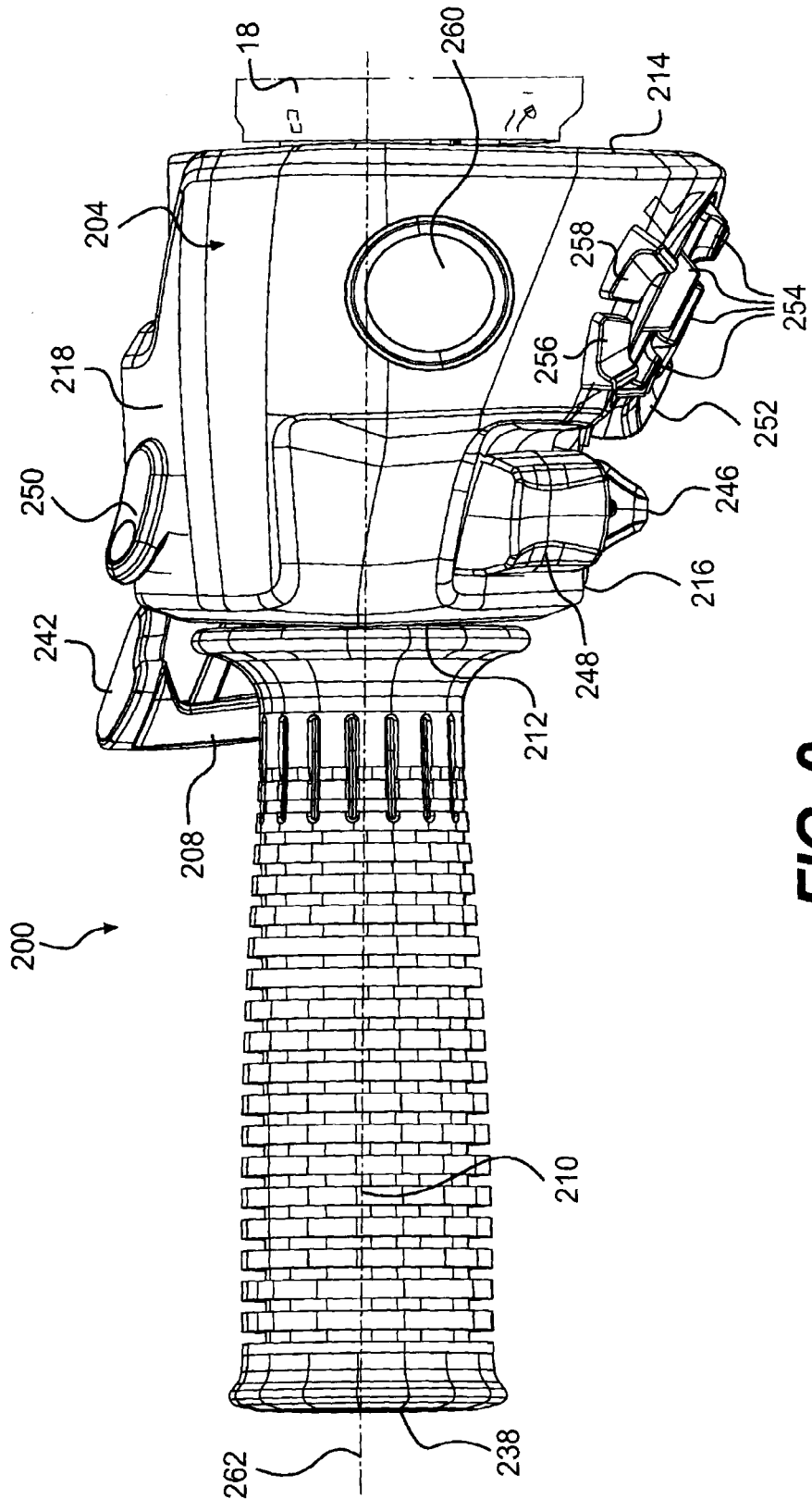
Figure 10:
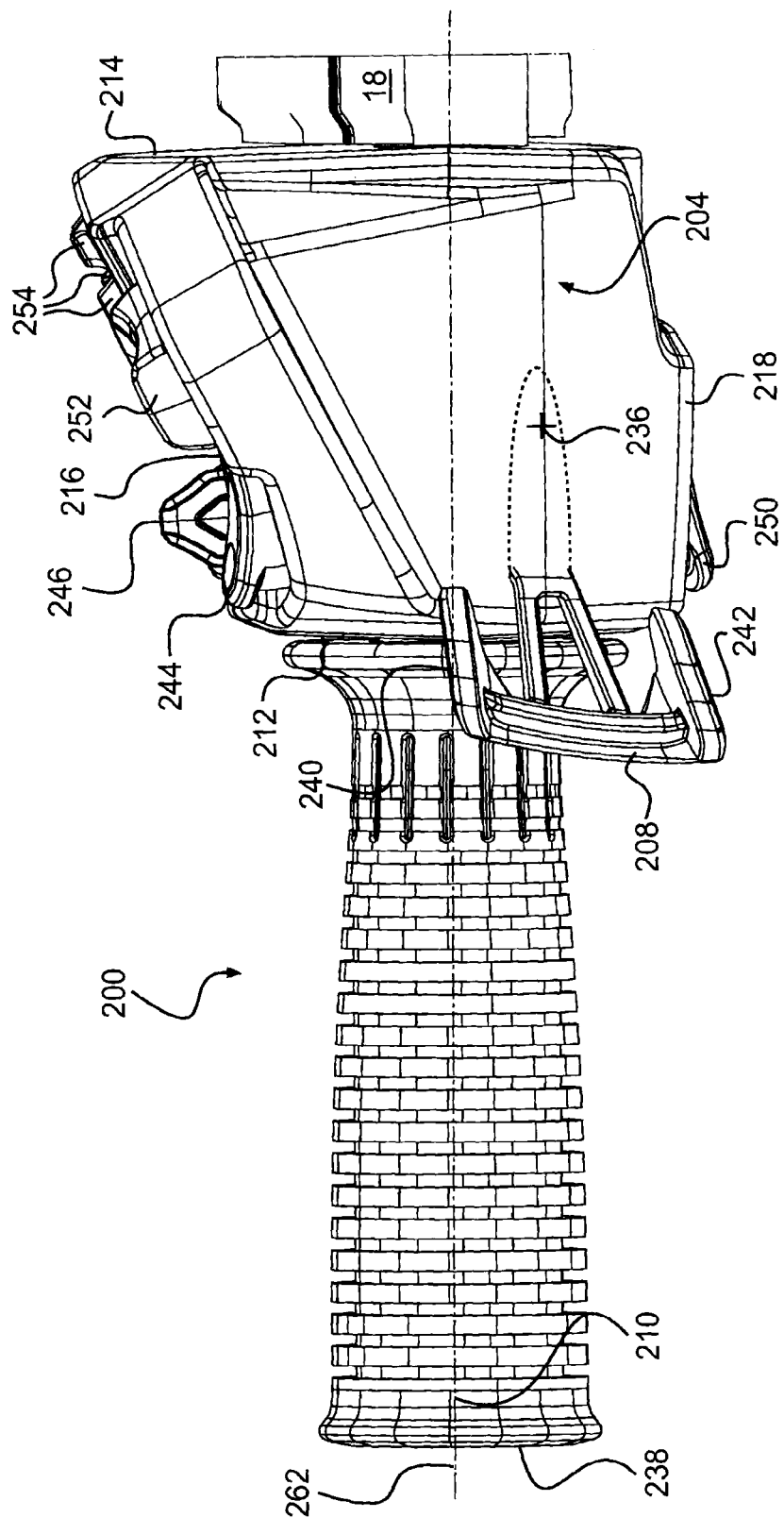
Figure 11:
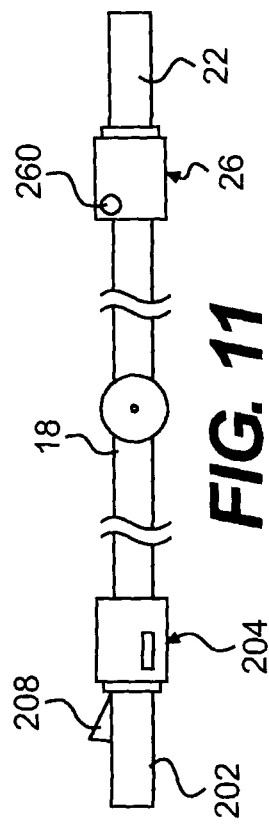
Figure 12:
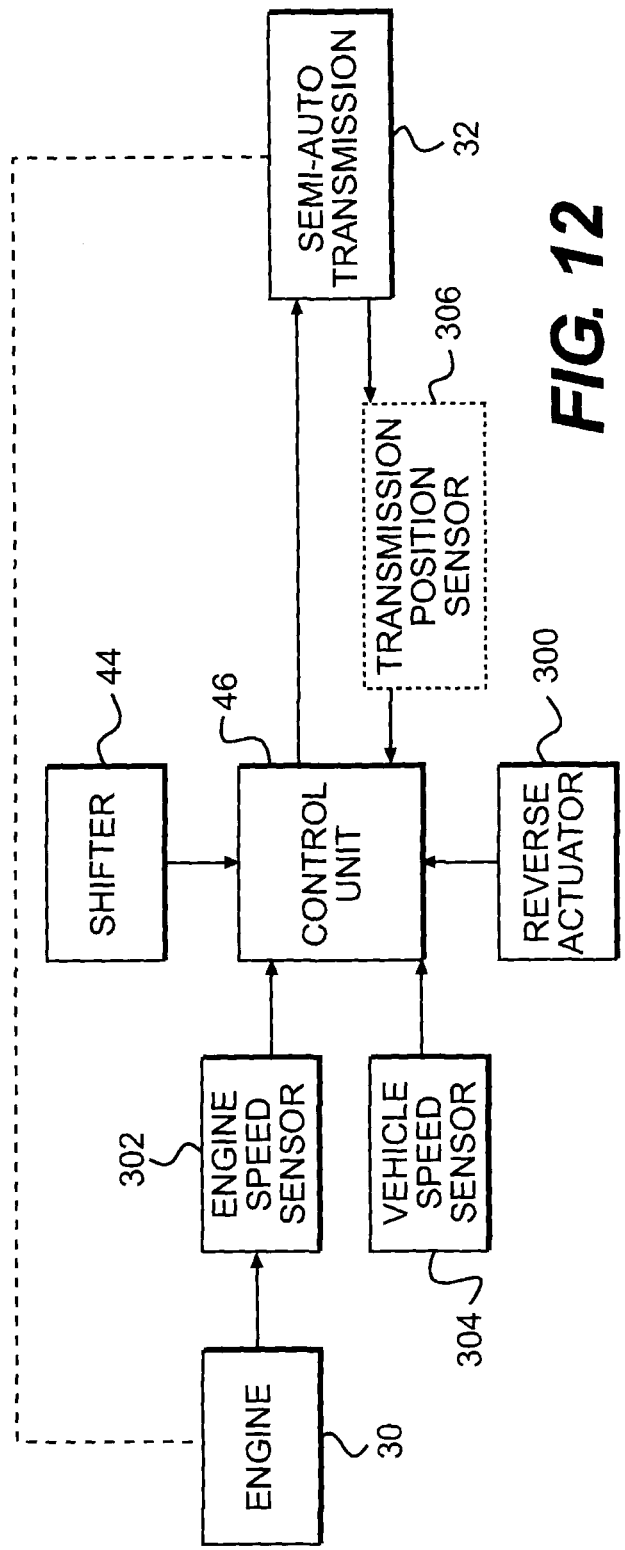

Turning now to FIGS. 8 to 10, another embodiment of a handle and housing arrangement 200 will be described. The arrangement 200 includes a left handle 202, a housing 204, a shifter in the form of shift lever 208, and various switches disposed on the housing 204 (described below). It is contemplated that the arrangement 200 could be provided on the other end of the handlebar 18, and as a result would include a right handle instead of the left handle 202.

The handle 202 is similar to the handle 102 described above. The handle 202 defines a longitudinal centerline 210 passing through a center thereof in a longitudinal direction.

The housing 204 is disposed adjacent to the handle 202. The housing 204 has a left side 212 (the handle side), a right side 214, a front side 216, a rear side 218, an upper surface 220, and a lower surface 222. The front and rear sides 216, 218 face generally towards a front and a rear of the vehicle 10 respectively when disposed on the handlebar 18 as shown in FIG. 1.

The shift lever 208 is pivotally connected to the housing 204 about shift lever axis 236 (FIG. 10). As can be seen in FIG. 8, the shift lever axis 236 is generally perpendicular to the longitudinal centerline 210 of the handle 202. As can also be seen in FIG. 8, the shift lever 208 extends away from the left side 212 of the housing 204 toward the end 238 of the handle 202 and is disposed at least in part vertically below the handle 202. The shift lever 208 has a rear surface 240 adapted to be pressed by a thumb of a driver of the vehicle 10 and a front surface 242 adapted to be pressed by an index finger of the driver (although other fingers may be used). When the shift lever 208 is in the rest position as shown, the rear and front surfaces 240, 242 face generally towards the rear and the front of the vehicle 10 respectively when disposed on the handlebar 18 as shown in FIG. 1. As seen in FIG. 8, the rear surface 240 is generally L-shaped. As also seen in FIG. 8, a portion of the rear surface 240 extends vertically above the lower surface 222 of the housing 204. This positions the rear surface 240 in a location where it can be easily pressed by the thumb of the driver.

In a preferred embodiment, pressing the rear surface 240 of the shift lever 208 towards the front of the vehicle 10 moves the shift lever 208 to the up-shift position and pressing the front surface 242 of the shift lever 208 towards the rear of the vehicle 10 moves the shift lever 208 to the down-shift position. It is contemplated, however, that pressing the rear surface 240 could alternatively move the shift lever 108 to the down-shift position and that pressing the front surface 242 would move the shift lever 208 to the up-shift position.

A push button 244 is provided on the rear side 218 of the housing 204. Pushing the push button 244 actuates a horn of the vehicle 10. A sliding switch 246 is provided on the rear side 218 of the housing 204 vertically above the push button 244. Sliding the sliding switch 246 to the left actuates a left turn signal of the vehicle 10. Similarly, sliding the sliding switch 246 to the right actuates a right turn signal of the vehicle 10. A toggle switch 248 is disposed near an upper surface 220 of the housing 204. The toggle switch 248 is used to control the headlights of the vehicle 10. The toggle switch 248 has three positions In the first position, the headlights are turned on in a low beam mode. In the second position, the headlights are turned on in a high beam mode which provides more light than in the low beam mode. In the third position, the headlights are turned on momentarily to the high beam mode and returns to the low beam mode since the third position of the switch 248 is biased towards the second position. A push button 250 is provided on the front side 216 of the housing 204. If the helmet of the driver is equipped with a radio-communication device which is connected to the vehicle 10, pushing the push button 250 allows the driver of the vehicle 10 to communicate with drivers of other vehicles equipped with similar radio-communication devices.

By positioning the push button 244, the sliding switch 246, the toggle switch 248, and the push button 250 on the housing 204 near the left handle 202, they can be easily reached by the fingers of the left hand of the driver.

A toggle switch 252 is disposed on the rear side 216 of the housing 204 laterally next to the push button 244. The toggle switch 252 is used to raise or lower a windshield of the vehicle 10. A set of four push buttons 254 are disposed in a circular pattern on the rear side 216 of the housing laterally next to the sliding switch 246 and the toggle switch 248 and vertically above the toggle switch 252. Vertically positioned above the push buttons 254, are push buttons 256 and 258 which are disposed next to each other. The push button 256 is a mode button used to select an electronic device integrated with or connected to the vehicle 10, such as a radio, a CD player, an MP3 player, and a radio-communication device. Pushing the button 256 also causes a display cluster of the vehicle 10 to display a menu screen associated with the mode selected. For example, pushing the button 256 until a radio mode is selected turns on the radio and displays a radio menu on the display cluster. The radio menu would have a portion of the cluster indicating the selected radio station, and another indicating the volume of the radio. The push buttons 254 are used to navigate the menus on the display cluster of the vehicle 10 and/or to modify features associated with a particular menu. For example, in the radio menu, the left and right push buttons 252 are used to change a radio station and the up and down push buttons 254 are used to change a volume of the radio. The push button 258 is a set button which, in at least some menus, is used to select menu items of a particular menu to be modified by the push buttons 254 (with the associated function of the associated electronic device being modified accordingly). Once the selected menu item has been modified, the push button 258 is pressed to set the modification and allow the push buttons 254 to be used to navigate the menu.

A push button 260 is disposed on the upper surface 220 of the housing 206. The push button 260 is a reverse actuator which has the same function as the push button 152 described above. By locating the push button 260 above the handle 202 and the shift lever 208 below the handle 202 as shown, the shift lever 208 cannot be moved and the push button 260 pushed simultaneously by using the fingers of the left hand only. Therefore, the driver has to remove his right hand from the right handle 22 and use a finger of the right hand to push the push button 260 while the finger(s) of the left hand are used to move the shifter 208. By forcing the driver to release the right handle 22 to push the push button 260, the driver also releases the throttle actuator of the vehicle 10, which eventually reduces the speed of the vehicle 10 below the desired level at which the reverse gear 34 can be selected.

Figure 11:
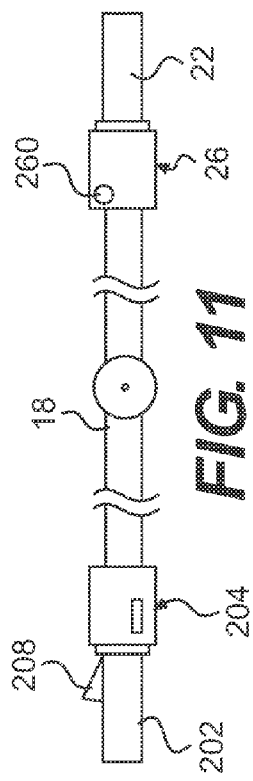
FIG. 11 is a schematic representation of an alternative embodiment of a handlebar, handles, and housings arrangement of the vehicle of FIG. 1.

FIG. 11 illustrates an alternative embodiment where the shift lever 208 is still positioned near the left handle 202 but where the button 260 is disposed on the right housing 26. The right handle 22 is a twist-grip that is used as a throttle actuator for the controlling the amount of air delivered to the engine 30. The button 260 is sufficiently spaced from the right handle 22 that the driver is forced to release the right handle 22 to push the push button 260, thus the driver also releases the throttle actuator of the vehicle 10 which eventually reduces the speed of the vehicle 10 below the desired level at which the reverse gear 34 can be selected.

Returning to FIGS. 8 to 10, a vertically extending plane 262 contains the longitudinal centerline 210 of the handle 202, and a plane 264 is perpendicular to the vertically extending plane 262 and also contains the longitudinal centerline 210 of the handle 202. The rear surface 240 of the shift lever 208, the push button 244, and the toggle switch 252 are arranged such that a plane 266 exists that is parallel to the plane 264 (and is therefore parallel to the longitudinal centerline 210) and is perpendicular to the vertically extending plane 262 which intersects rear surface 240 of the shift lever 208, the push button 244, and the toggle switch 252. It is contemplated that push button 244 and the toggle switch 252 could be different types of switches and/or could have a different functions than the ones described above.

As shown in FIG. 10, when the shift lever 208 is in its rest position as shown, the rear surface 240 of the shift lever 108 does not extend forwardly or rearwardly of the handle 102. Although not specifically shown, but as would be understood from FIG. 10, a normal projection of the rear surface 140 onto either one of planes 264 and 266 is disposed between the outer edges of a normal projection of the handle 202 onto a corresponding one of the planes 264 and 266 in a direction perpendicular to the longitudinal centerline 210 of the handle 202. By positioning the rear surface 240 of the shift lever 208, the push button 244, and the toggle switch 252 as shown, the rear surface 240, the push button 244, and the toggle switch 252 can easily be reached by a thumb of the driver of the vehicle 10 while still maintaining a firm grip of the handle 102. Transition from one of the rear surface 240, the push button 244, and the toggle switch 252 to another one of the rear surface 240, the push button 244, and the toggle switch 252 is also facilitated.

Turning now to FIG. 12, inputs and outputs of the control unit 46 of the semi-automatic transmission 32 will be described. It is contemplated that the control unit 46 of the semi-automatic transmission 32 could be a separate stand alone unit disposed on the vehicle 10 or that its functions could be integrated into a control unit used to control the operation of the engine 30. As previously described, the shifter 44 is electronically connected to the control unit 46. When the shifter 44 is moved to the up-shift or down-shift position, a signal representative of that position is sent to the control unit 46. The shifter 44 may be any one of shift levers 108 and 208, or both shift levers 108' and 109, or any other type of shifter such as a pair of buttons for example. A reverse actuator 300, such as one of push buttons 152 and 260 or any other type of switch, is electronically connected to the control unit 46 and sends a signal to the control unit 46 when it is actuated. An engine speed sensor 302 is connected to the engine 30 and senses a speed of rotation of a shaft of the engine 30 (i.e. engine speed), such as an output shaft (not shown). The engine speed sensor 302 is electronically connected to the control unit 46 and sends a signal representative of the engine speed to the control unit 46. A vehicle speed sensor 304 is electronically connected to the control unit 46 and sends a signal representative of the vehicle speed to the control unit 46. The vehicle speed sensor 304 could be a sensor disposed near one of the wheels 14, 16 to sense a speed of rotation of the one of the wheels 14, 16 from which the speed of the vehicle 10 can be determined. Alternatively, the vehicle speed sensor 304 could be part of a global positioning system (GPS) provided on the vehicle 10. Other types of vehicle speed sensors 304 are also contemplated. As would be understood, the vehicle speed can be determined with a GPS by calculating a change of position of the vehicle 10 over time. To control the semi-automatic transmission 32, the control unit 46 is also preferably provided with information concerning a gear or position currently selected by the semi-automatic transmission 32. This can be done by having the control unit 46 store in memory the latest selection command sent to the semi-automatic transmission 32. Alternatively, a transmission position sensor 306 could be connected to the semi-automatic transmission 32 to sense which of the gears 34, 38, 40, and 42 or position 36 is currently selected by the semi-automatic transmission 32 and to send a signal representative of that selection to the control unit 46. As described below with respect to FIGS. 13 and 14, the control unit 46 sends a signal based on these various inputs to the semi-automatic transmission 32 to cause the semi-automatic transmission 32 to shift up or down, as the case may be.

Figure 13:
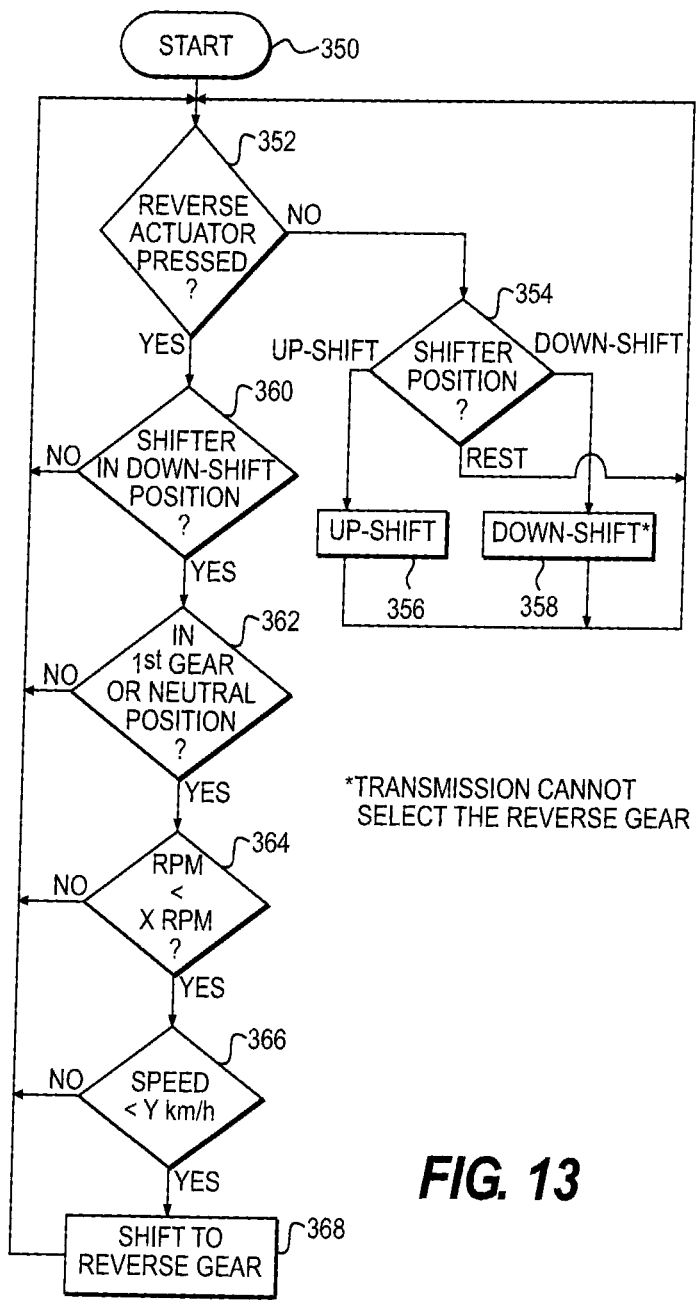
FIG. 13 is a logic diagram of a method of controlling the semi-automatic transmission of the vehicle of FIG. 1.
Figure 14:
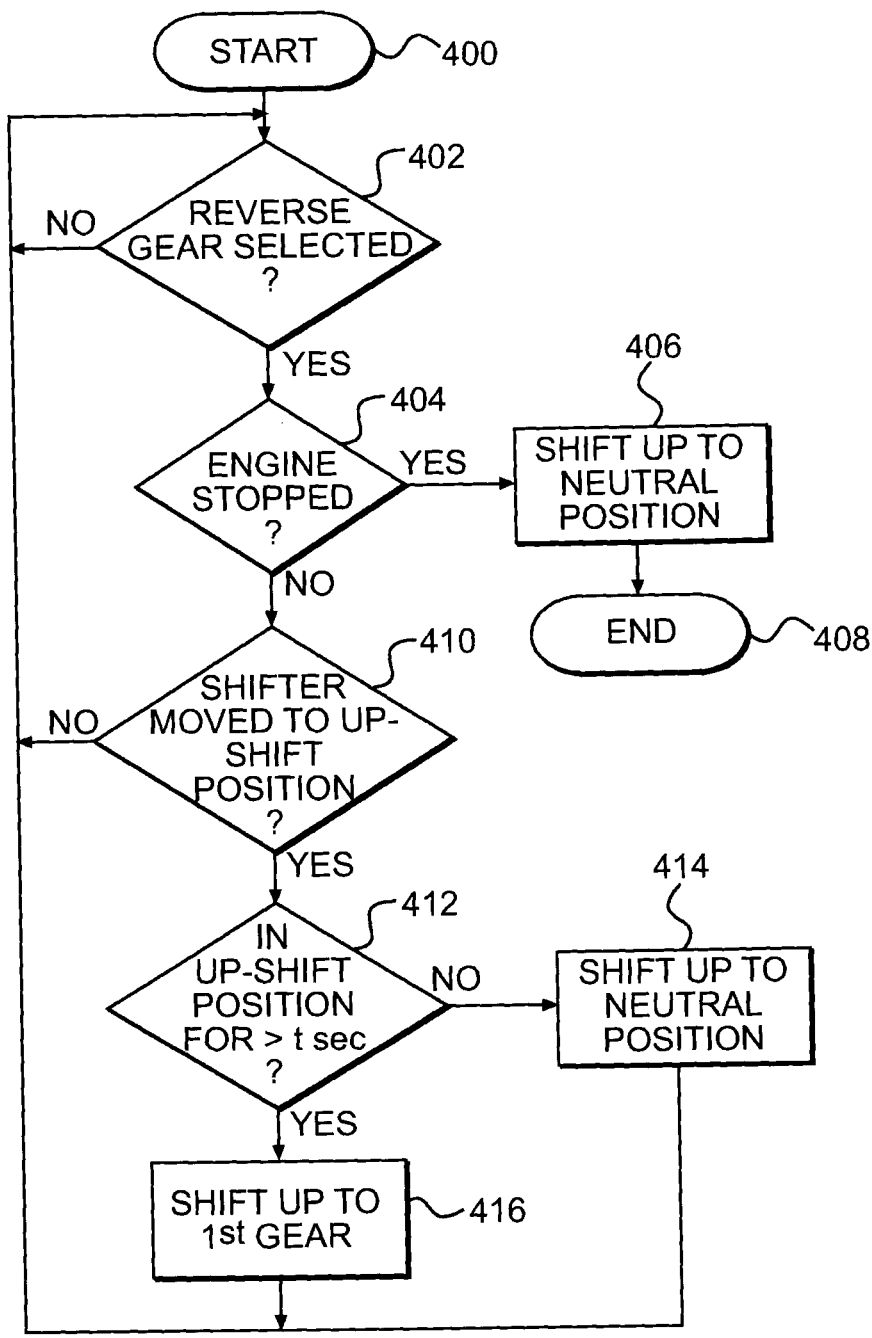

Turning now to FIG. 13, a method of controlling the semi-automatic transmission 32 will be described. The method starts at step 350. At step 352, the control unit 46 determines if the reverse actuator 300 has been actuated. If the reverse actuator 300 is not actuated, then at step 354 the control unit determines the position of the shifter 44. If the shifter 44 is in the rest position the control unit 46 returns to step 352. If the shifter 44 is in the up-shift position, at step 356 the control unit 46 sends a signal to the semi-automatic transmission 32 to cause the semi-automatic transmission 32 to up-shift. If the shifter 44 is in the down-shift position, at step 358 the control unit 46 sends a signal to the semi-automatic transmission 32 to cause the semi-automatic transmission 32 to down-shift. Note however that at step 358 the control unit 46 would not send a signal to the semi-automatic transmission 32 that would cause the semi-automatic transmission 32 to down-shift and select the reverse gear 34. A signal to down-shift and select the reverse gear 34 will only be sent to the semi-automatic transmission 32 if at step 352 it is determined that the reverse actuator 300 has been actuated and if the conditions set at steps 360 to 366 described below are met. Following either one of steps 356 and 358, the control unit returns to step 352.

If at step 352 the control unit 46 determines that the reverse actuator 300 has been actuated, the control unit 46 moves to step 360. At step 360 the control unit determines if the shifter 44 is in the down-shift position. If the shifter 44 is in the rest or up-shift positions, the control unit 46 returns to step 352. If the shifter 44 is in the down-shift position, then the control unit 46 moves to step 362. It is contemplated that if at step 360 it is determined that the shifter 44 is in the up-shift position, the control unit 46 could nonetheless continue to step 362 since it could interpret movement of the shifter 44 in to any position (up-shift or down-shift) while the reverse actuator 300 is actuated as being indicative of a desire by the driver to have the vehicle 10 move in a reverse direction.

At step 362, the control unit 46 then determines if the first gear 38 or the neutral position 36 is currently selected by the semi-automatic transmission 32. If not, then the control unit 46 returns to step 352. If so, then the control unit 46 moves to step 364. Note that if at step 362 it is determined that the first gear 38 is currently selected, and if the conditions set at steps 364 and 366 described below are met, once the control unit 46 reaches step 368, the control unit 46 will send a signal to the semi-automatic transmission 32 to shift down directly to the reverse gear 34 from the first gear 38 (thus by-passing the neutral position 36) or alternatively to shift down twice (once to get to the neutral position 36 and once to select the reverse gear 34).

At step 364, the control unit 46 determines if the engine speed is below a predetermined engine speed (X RPM). The predetermined engine speed is preferably a low engine speed between 500 RPM and 2500 RPM, since selecting the reverse gear 34 at high engine speeds may cause damage to one or more components of the engine 30, the semi-automatic transmission 32, the connection between the engine 30 and the semi-automatic transmission 32, and a connection between the semi-automatic transmission 32 and the wheel 16. If the engine speed is not below the predetermined engine speed, the control unit 46 returns to step 352. If the engine speed is below the predetermined level, then the control unit moves to step 366.

At step 366, the control unit 46 determines if the vehicle speed is below a predetermined vehicle speed (Y km/hour). The predetermined vehicle speed is preferably less than 10 km/hour, since selecting the reverse gear 34 at higher vehicle speeds may cause damage to one or more components of the engine 30, the semi-automatic transmission 32, the connection between the engine 30 and the semi-automatic transmission 32, and the connection between the semi-automatic transmission 32 and the wheel 16. Also, the change in direction of the vehicle 10 at higher speeds could result in the driver feeling suddenly pushed towards the front of the vehicle 10. If the vehicle speed is not below the predetermined vehicle speed, the control unit 46 returns to step 352. If the vehicle speed is below the predetermined level, then the control unit moves to step 368.

At step 368, the control unit 46 sends a signal to the semi-automatic transmission 32 to down-shift and engage the reverse gear 34.

In summary, the control unit 46 will only send a signal to the semi-automatic transmission 32 to down-shift and engage the reverse gear 34 if the reverse actuator 300 is actuated while the shift lever 44 is moved to the down-shift position, the first gear 38 or the neutral position 36 is selected by the semi-automatic transmission 32 prior to the reverse actuator 300 being actuated while the shift lever 44 is moved to the down-shift position, the engine speed is below a predetermined engine speed, and the vehicle speed is below a predetermined vehicle speed. It is contemplated that more or fewer steps could be provided between steps 352 and 368. For example, it may not be necessary to have one of steps 364 and 366 if the other one of steps 364 and 366 is present. It is also contemplated that for the control unit 46 to send a signal to the semi-automatic transmission 32 to down-shift and engage the reverse gear 34, the control unit 46 could simply determine if the reverse actuator 300 is actuated while the shift lever 44 is moved to one of the down-shift position and the up-shift position.

Figure 14:
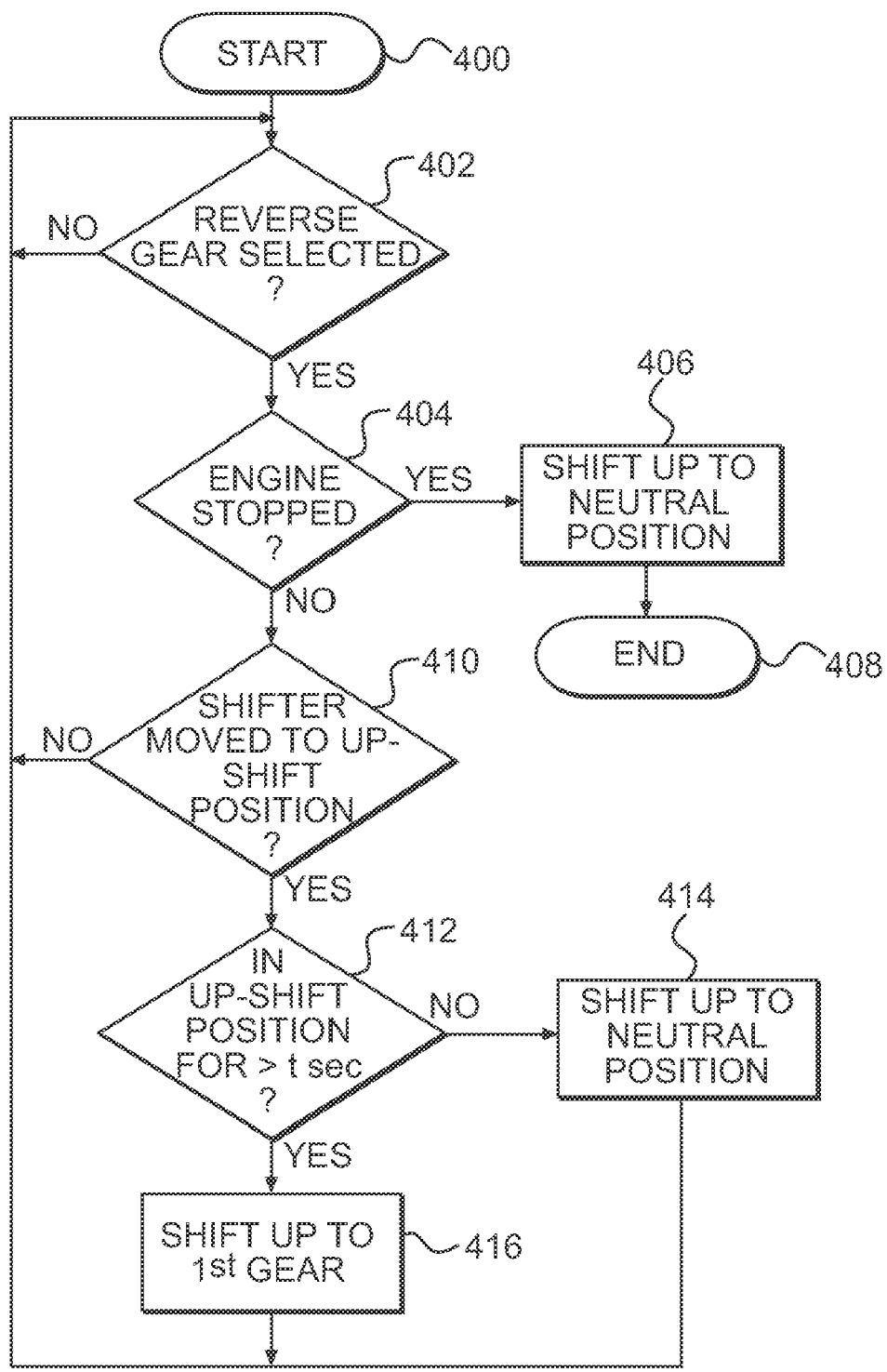
FIG. 14 is a logic diagram of a method of controlling the semi-automatic transmission of the vehicle of FIG. 1 once the transmission has selected the reverse gear.
Figure 1:
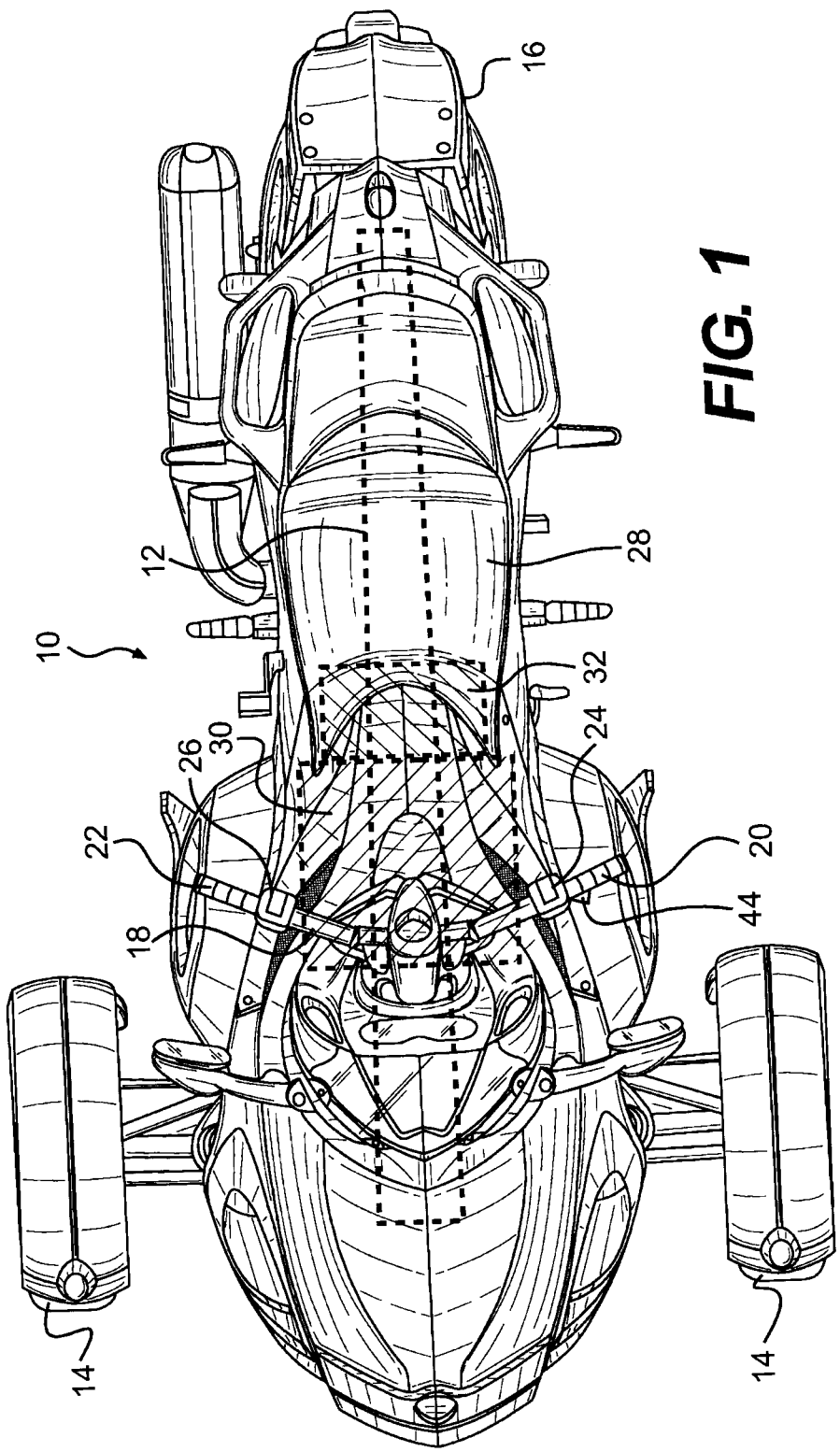
Figure 2A:
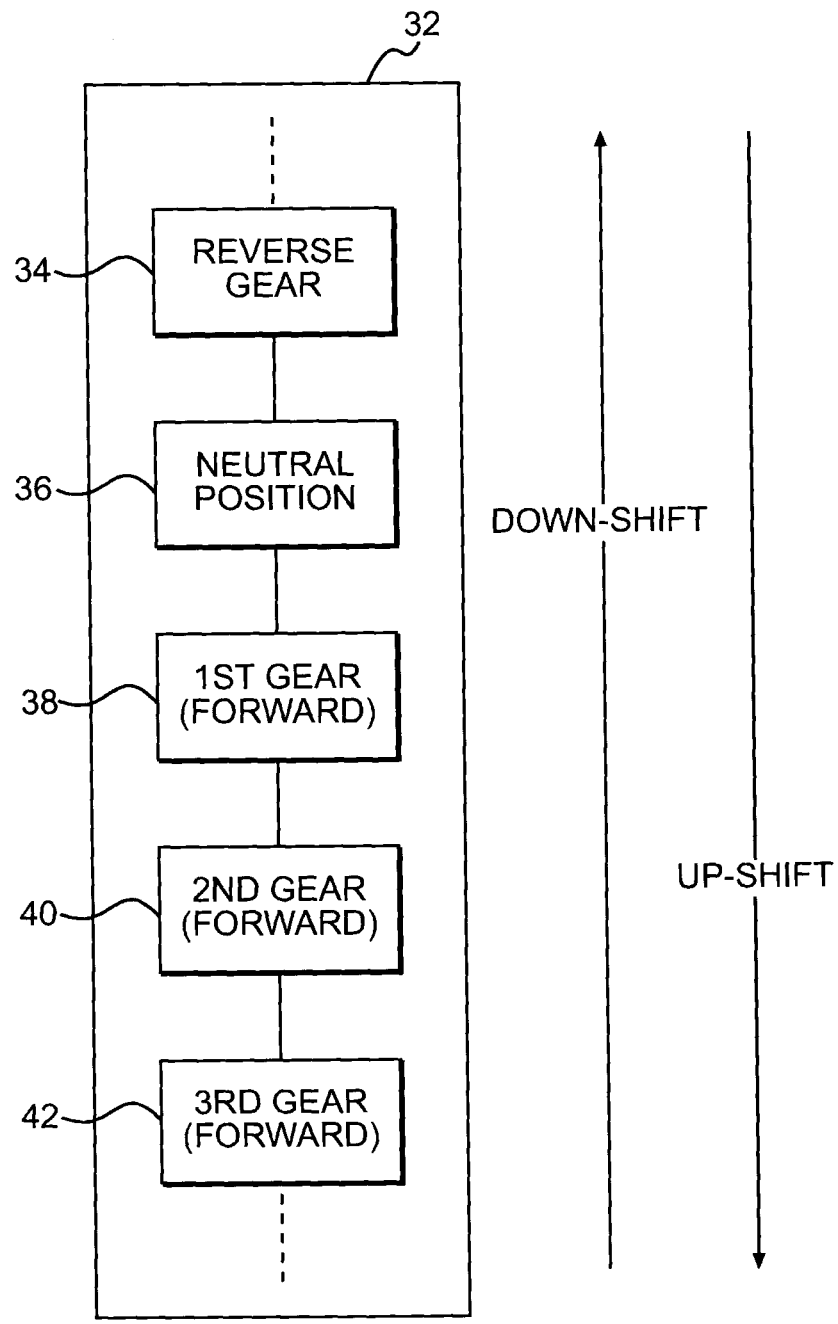
Figure 3:
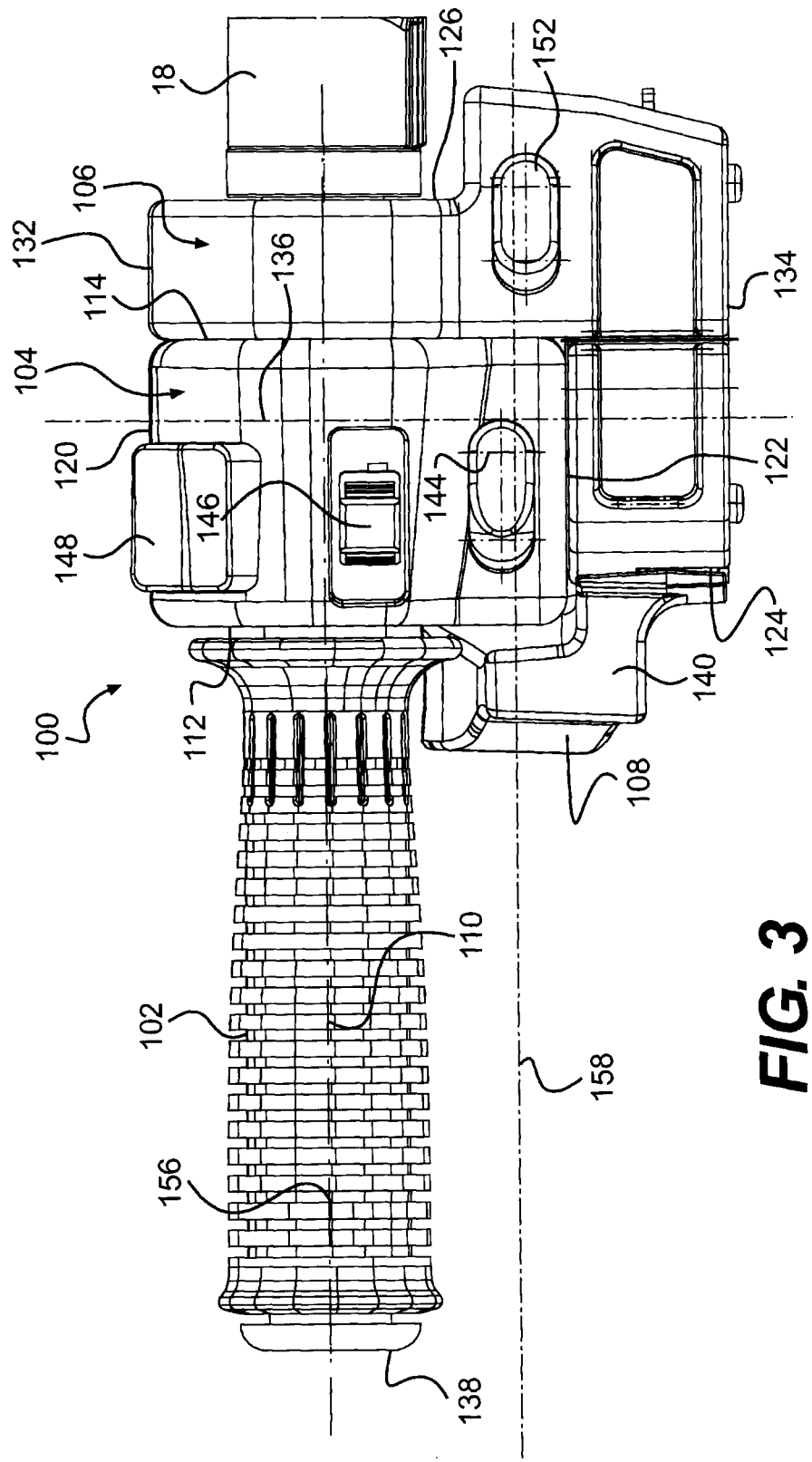
Figure 4:
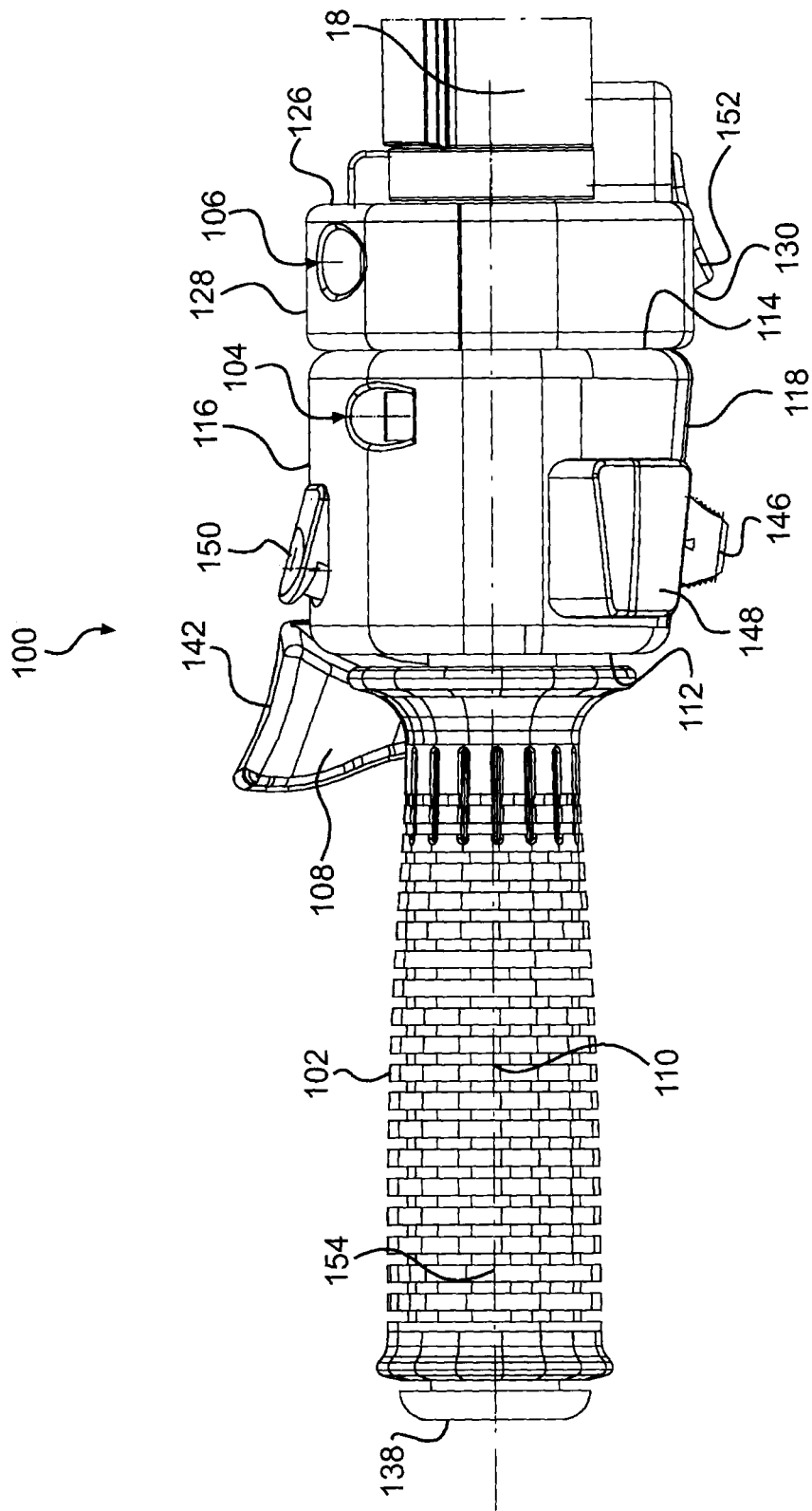
Figure 5:
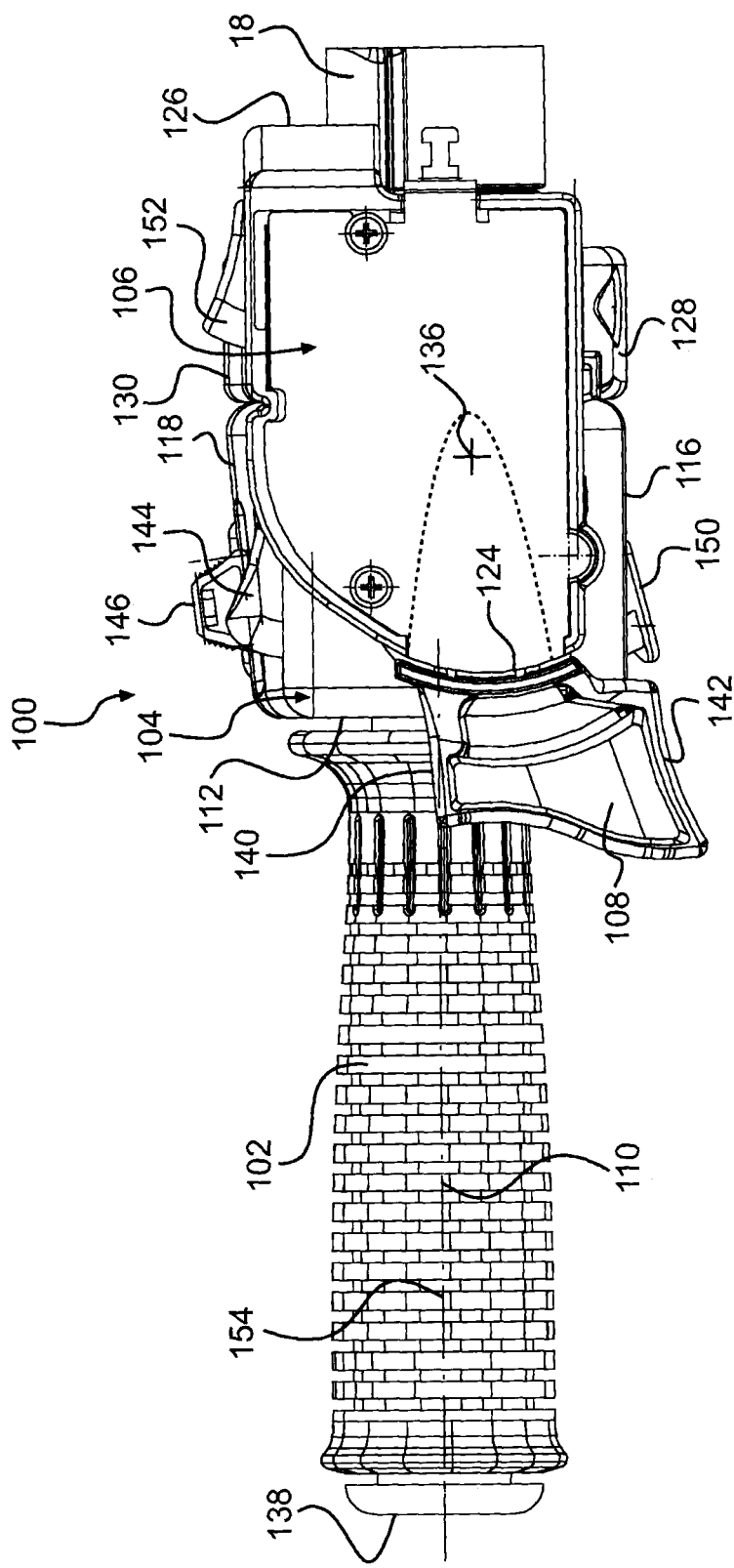
Figure 6:
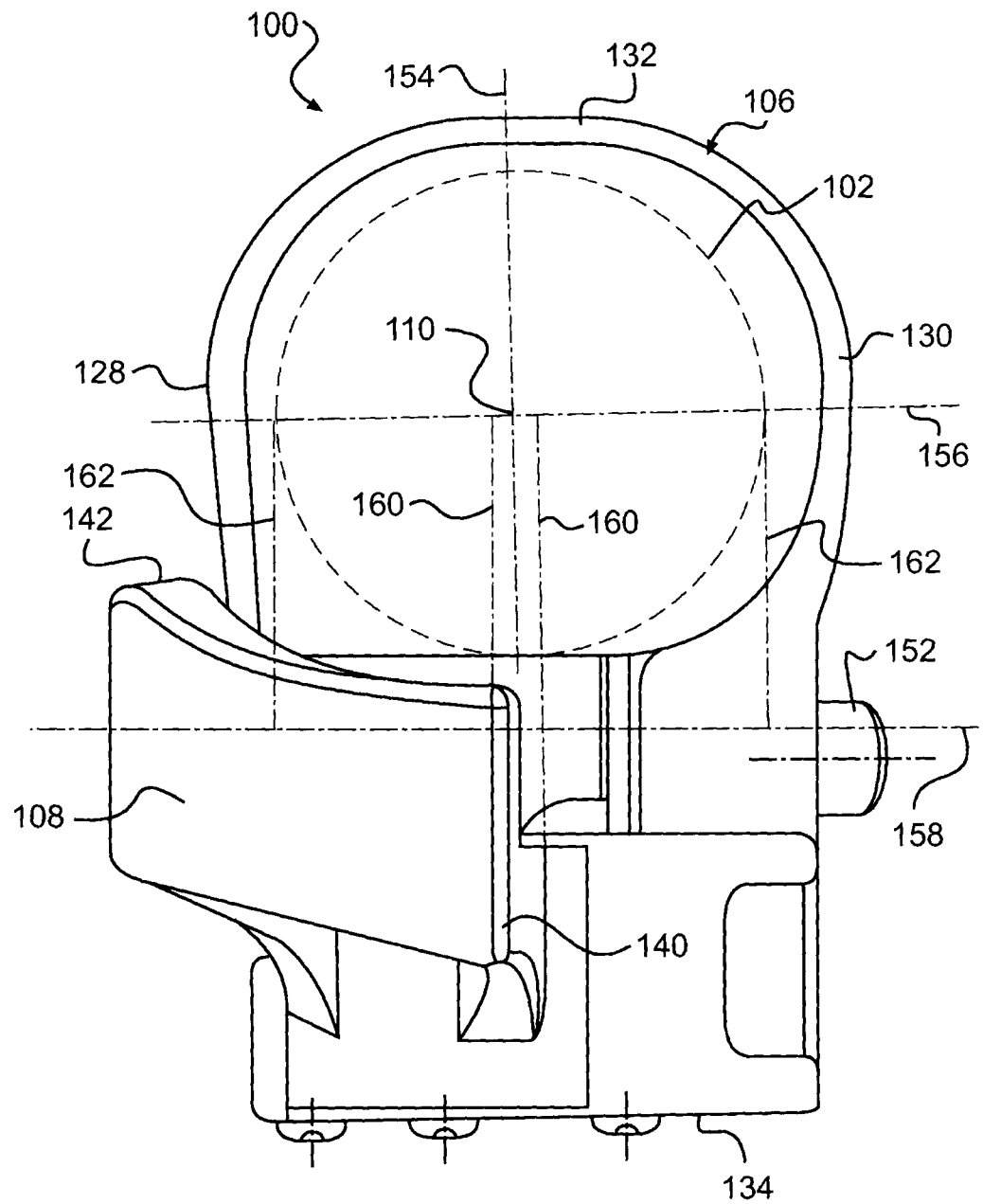
Figure 7:
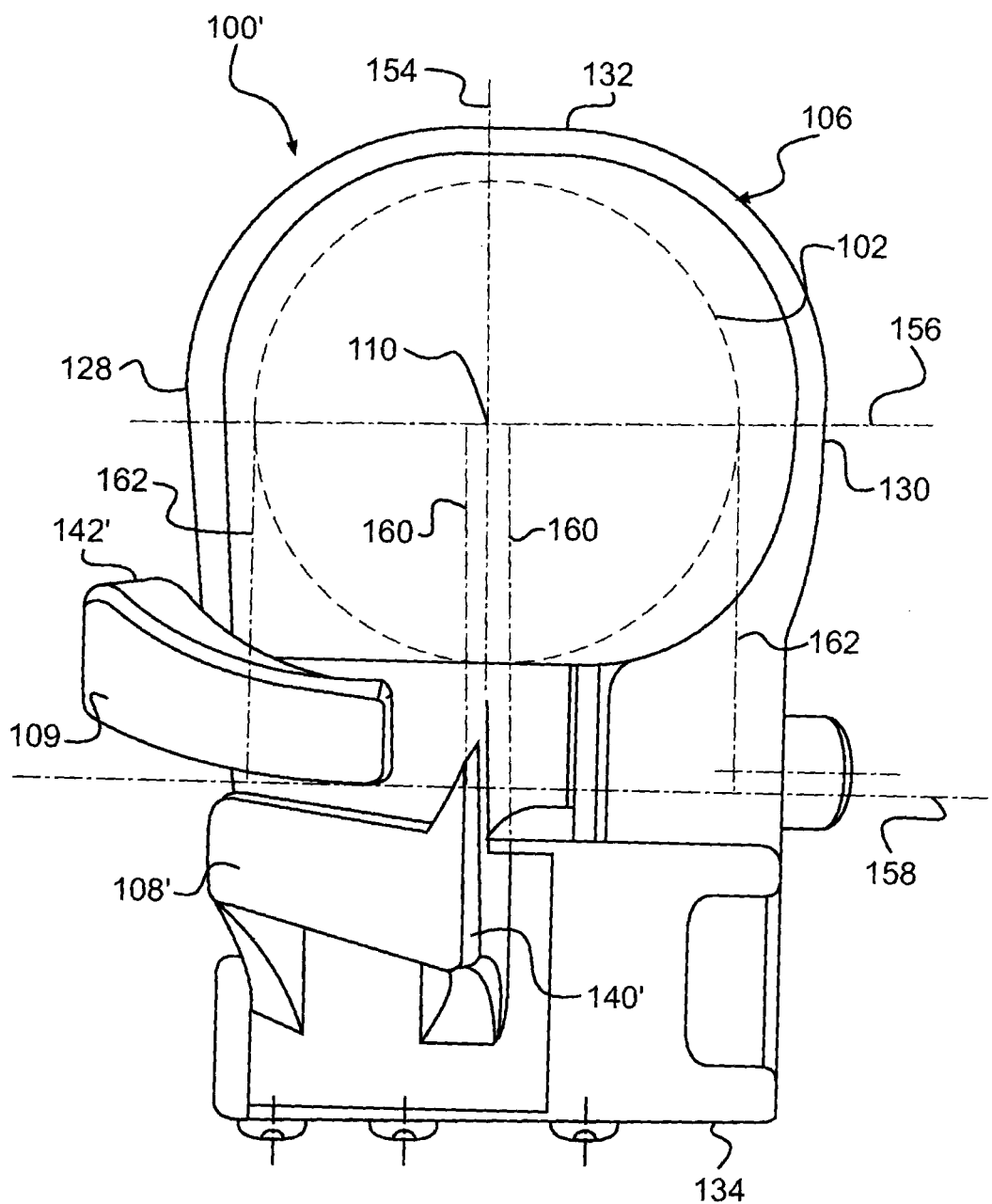

Turning now to FIG. 14, a method of controlling the semi-automatic transmission 32 once the semi-automatic transmission 32 has selected the reverse gear 34 will be described. The method starts at step 400. At step 402, the control unit 46 first determines if the reverse gear 34 is selected by the semi-automatic transmission 32. If not, the control unit 46 unit will repeat step 402 until the reverse gear 34 is selected. If the reverse gear 34 is selected, the control unit 46 moves to step 404.

At step 404, the control unit 46 determines if the engine 30 has been stopped. If the engine 30 has been stopped, the control unit 46 moves to step 406 and sends a signal to the semi-automatic transmission 32 to cause the semi-automatic transmission 32 to select the neutral position 36 and the method ends at step 408. Note that anytime the engine 30 is stopped, regardless of the gear being selected by the semi-automatic transmission 32, it is preferable for the control unit 46 to send a signal to the semi-automatic transmission 32 to cause it to select the neutral position 36. This will ensure that the semi-automatic transmission 32 is in the neutral position 36 upon the next engine start-up. If at step 404, the engine 30 is running, the control unit moves to step 410.

At step 410, the control unit 46 determines if the shifter 44 is in the up-shift position. If not, then the control unit 46 returns to step 402. If it is, then the control unit 46 moves to step 412 where it determines if the shifter 44 has been in the up-shift position for more than a predetermined time (t sec.) prior to being released. The predetermined time 't' is preferably around 2 seconds. If the shifter 44 has been released before the predetermined time has been exceeded, then at step 414 the control unit 46 sends a signal to the semi-automatic transmission 32 to shift up to select the neutral position 36. If the shifter 44 has been in the up-shift position for more than the predetermined time, then the control unit 46 sends a signal to the semi-automatic transmission 32 to shift up directly to the first gear 38 from the reverse gear 34 (thus by-passing the neutral position 36) or alternatively to shift up twice (once to get to the neutral position 36 and once to select the first gear 38).

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

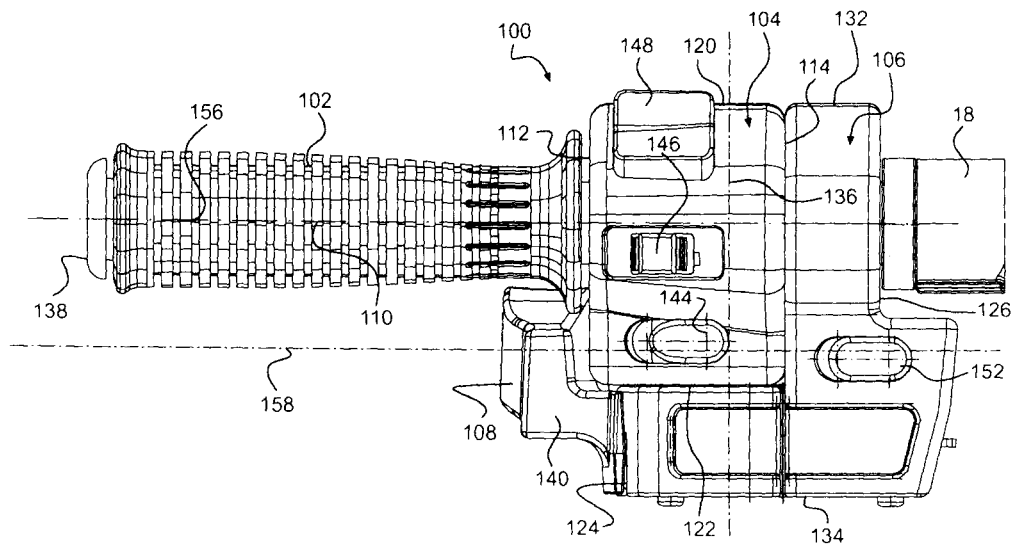

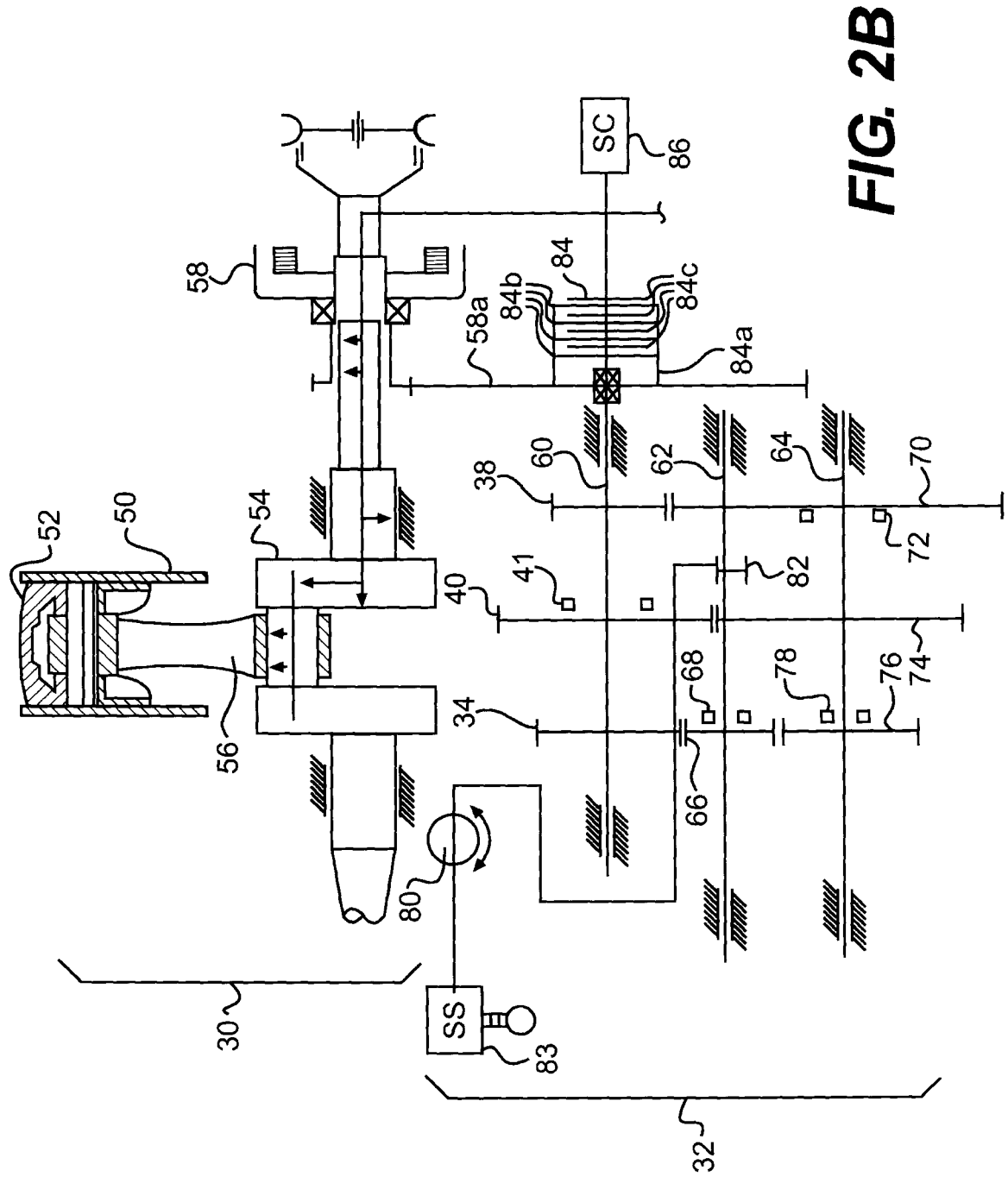

What is claimed is:

1. A vehicle comprising:
a frame;
at least two wheels connected to the frame;
a straddle seat disposed on the frame;
a handlebar disposed at least in part forwardly of the seat and operatively connected to at least one of the at least two wheels for steering the at least one of the at least two wheels, the handlebar having a first handle at a first end thereof and a second handle at a second end thereof, the first handle having a longitudinal centerline;
an engine disposed on the frame;
a semi-automatic transmission operatively connected to the engine and at least one of the at least two wheels for transmitting power from the engine to the at least one of the at least two wheels;
a housing disposed adjacent the first handle, the housing having a rear side generally facing towards a rear of the vehicle, and the housing having a handle side generally facing towards the first handle;
a switch disposed on the rear side of the housing; and
a shift lever pivotally connected to the housing, at least a portion of the shift lever extending away from the handle side of the housing towards an end of the first handle and being disposed at least in part vertically below the first handle, the shift lever having a rear surface generally facing towards the rear of the vehicle and a front surface generally facing towards the front of the vehicle, the shift lever being movable to an up-shift position by pressing one of the front surface and the rear surface, the shift lever being movable to a down-shift position by pressing a remaining one of the front surface and the rear surface, the shift lever being biased towards a rest position intermediate the up-shift and down-shift positions, and the shift lever being operatively connected to the semi-automatic transmission such that moving the shift lever to the up-shift position causes the semi-automatic transmission to shift up and moving the shift lever to the down-shift position causes the semi-automatic transmission to shift down;

wherein:
a first vertically extending plane contains the longitudinal centerline of the first handle;
a second plane contains the longitudinal centerline of the first handle and is perpendicular to the first plane;
the rear surface of the shift lever and the switch are arranged such that at least one third plane parallel to the second plane intersects both the rear surface of the shift lever and the switch; and
when the shift lever is in the rest position, a normal projection of the rear surface of the shift lever onto the second plane is disposed between outer edges of a normal projection of the first handle onto the second plane in a direction perpendicular to the longitudinal centerline of the first handle.

2. The vehicle of claim 1, wherein the housing includes a first housing and a second housing, the first housing being disposed between the second housing and the first handle.

3. The vehicle of claim 2, wherein the switch is disposed on the first housing.

4. The vehicle of claim 2, wherein the switch is disposed on the second housing.

5. The vehicle of claim 3, wherein the switch is a first switch;
the vehicle further comprising a second switch disposed on the rear side of the second housing; and
wherein the second switch is arranged such that the at least one third plane intersects the second switch.

6. The vehicle of claim 1, wherein the switch is a first switch;
the vehicle further comprising a second switch disposed on the rear side of the housing; and
wherein the second switch is arranged such that the at least one third plane intersects the second switch.

7. The vehicle of claim 1, wherein the switch is one of a push button, a toggle switch, and a sliding switch.

8. The vehicle of claim 1, wherein the rear surface of the shift lever is generally L-shaped.

9. A vehicle comprising:
a frame;
at least two wheels connected to the frame;
a straddle seat disposed on the frame;
a handlebar disposed at least in part forwardly of the seat and operatively connected to at least one of the at least two wheels for steering the at least one of the at least two wheels, the handlebar having a first handle at a first end thereof and a second handle at a second end thereof, the first handle having a longitudinal centerline;

an engine disposed on the frame;
a semi-automatic transmission operatively connected to the engine and at least one of the at least two wheels for transmitting power from the engine to the at least one of the at least two wheels;
a housing disposed adjacent the first handle, the housing having a rear side generally facing towards a rear of the vehicle, and the housing having a handle side generally facing towards the first handle;
a switch disposed on the rear side of the housing; and
a shift lever pivotally connected to the housing, at least a portion of the shift lever extending away from the handle side of the housing towards an end of the first handle and being disposed at least in part vertically below the first handle, the shift lever having a rear surface generally facing towards the rear of the vehicle and a front surface generally facing towards the front of the vehicle, the shift lever being movable to an up-shift position by pressing one of the front surface and the rear surface, the shift lever being movable to a down-shift position by pressing a remaining one of the front surface and the rear surface, the shift lever being biased towards a rest position intermediate the up-shift and down-shift positions, and the shift lever being operatively connected to the semi-automatic transmission such that moving the shift lever to the up-shift position causes the semi-automatic transmission to shift up and moving the shift lever to the down-shift position causes the semi-automatic transmission to shift down;

wherein:
a first vertically extending plane contains the longitudinal centerline of the first handle;
the rear surface of the shift lever and the switch are arranged such that at least one second plane perpendicular to the first plane and parallel to the longitudinal centerline of the first handle intersects both the rear surface of the shift lever and the switch; and
when the shift lever is in the rest position, a normal projection of the rear surface of the shift lever onto the second plane is disposed between outer edges of a normal projection of the first handle onto the second plane in a direction perpendicular to the longitudinal centerline of the first handle.

10. The vehicle of claim 9, wherein the housing includes a first housing and a second housing, the first housing being disposed between the second housing and the first handle.

11. The vehicle of claim 10, wherein the switch is disposed on the first housing.

12. The vehicle of claim 10, wherein the switch is disposed on the second housing.

13. The vehicle of claim 11, wherein the switch is a first switch;
the vehicle further comprising a second switch disposed on the rear side of the second housing; and
wherein the second switch is arranged such that the at least one second plane intersects the second switch.

14. The vehicle of claim 9, wherein the switch is a first switch;
the vehicle further comprising a second switch disposed on the rear side of the housing; and
wherein the second switch is arranged such that the at least one second plane intersects the second switch.

15. The vehicle of claim 9, wherein the switch is one of a push button, a toggle switch, and a sliding switch.

16. The vehicle of claim 9, wherein the rear surface of the shift lever is generally L-shaped.

17. A vehicle comprising: a frame;
   at least two wheels connected to the frame;
   a straddle seat disposed on the frame;
   a handlebar disposed at least in part forwardly of the seat and operatively connected to at least one of the at least two wheels for steering the at least one of the at least two wheels, the handlebar having a first handle at a first end thereof and a second handle at a second end thereof, the first handle having a longitudinal centerline;
   an engine disposed on the frame;
   a semi-automatic transmission operatively connected to the engine and at least one of the at least two wheels for transmitting power from the engine to the at least one of the at least two wheels;
   a housing disposed adjacent the first handle, the housing having a lower surface, and the housing having a handle side generally facing towards the first handle; and
   a shift lever pivotally connected to the housing about a shift lever axis, the shift lever axis being generally perpendicular to the longitudinal centerline of the first handle, at least a portion of the shift lever extending away from the handle side of the housing towards an end of the first handle and being disposed at least in part vertically below the first handle, the shift lever having a rear surface generally facing towards the rear of the vehicle and a front surface generally facing towards the front of the vehicle, at least a portion of the rear surface extending vertically above the lower surface of the housing, the shift lever being movable to an up-shift position by pressing one of the front surface and the rear surface, the shift lever being movable to a down-shift position by pressing a remaining one of the front surface and the rear surface, the shift lever being biased towards a rest position intermediate the up-shift and down-shift positions, the rear surface being at a first distance from the longitudinal centerline, the front surface being at a second distance from the longitudinal centerline, the second distance being greater than the first distance, the first and second distances being measured perpendicularly to a vertically extending plane containing the longitudinal centerline, the first and second distances being measured from a common point on the vertically extending plane, and
   the shift lever being operatively connected to the semi-automatic transmission such that moving the shift lever to the up-shift position causes the semi-automatic transmission to shift up and moving the shift lever to the down-shift position causes the semi-automatic transmission to shift down.

18. The vehicle of claim 17, wherein the housing includes a first housing having a lower surface and a second housing having a lower surface, the first housing being disposed between the second housing and the first handle, and at least a portion of the rear surface extends vertically above both the lower surfaces of the first and second housings.

19. The vehicle of claim 17, wherein:
   a first vertically extending plane contains the longitudinal centerline of the first handle;
   a second plane contains the longitudinal centerline of the first handle and is perpendicular to the first plane; and
   when the shift lever is in the rest position, a normal projection of the rear surface of the shift lever onto the second plane is disposed between outer edges of a normal projection of the first handle onto the second plane in a direction perpendicular to the longitudinal centerline of the first handle.

\* \* \* \* \*

UNITED STATES PATENT AND TRADEMARK OFFICE
CERTIFICATE OF CORRECTION

| | |
|---|---|
| PATENT NO. | : 8,006,798 B2 |
| APPLICATION NO. | : 12/989761 |
| DATED | : August 30, 2011 |
| INVENTOR(S) | : Martin Portelance |

It is certified that error appears in the above-identified patent and that said Letters Patent is hereby corrected as shown below:

Delete Title Page, and replace with new Title Page. (attached)

Delete Drawing Sheets 1-14, and replace with new Drawing Sheets 1-14.

Signed and Sealed this
Twenty-fifth Day of October, 2011

David J. Kappos
*Director of the United States Patent and Trademark Office*

CERTIFICATE OF CORRECTION (continued)

(12) United States Patent
Portelance

(10) Patent No.: US 8,006,798 B2
(45) Date of Patent: Aug. 30, 2011

(54) VEHICLE HAVING A SHIFT LEVER ON A HANDLEBAR THEREOF

(75) Inventor: Martin Portelance, Chicoutimi (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 12/989,761

(22) PCT Filed: Apr. 30, 2008

(86) PCT No.: PCT/US2008/062063
§ 371 (c)(1),
(2), (4) Date: Oct. 26, 2010

(87) PCT Pub. No.: WO2009/134258
PCT Pub. Date: Nov. 5, 2009

(65) Prior Publication Data
US 2011/0042158 A1    Feb. 24, 2011

(51) Int. Cl.
*B60K 20/06* (2006.01)
*B60K 23/02* (2006.01)
*H01H 9/06* (2006.01)
*H01H 3/22* (2006.01)

(52) U.S. Cl. .............. 180/336; 180/333; 200/61.88; 200/61.91

(58) Field of Classification Search .......... 180/336, 180/333; 200/61.85, 61.88, 61.91
See application file for complete search history.

(56) References Cited

U.S. PATENT DOCUMENTS

| | | | | |
|---|---|---|---|---|
| 4,455,463 A | * | 6/1984 | Rohl | 200/61.85 |
| 4,570,078 A | * | 2/1986 | Yashima et al. | 307/10.1 |
| 4,619,154 A | * | 10/1986 | Yamanaka | 74/489 |

(Continued)

FOREIGN PATENT DOCUMENTS

CA    2259778 A1    7/2000

(Continued)

OTHER PUBLICATIONS

International Search Report from PCT/US2008/062063 from J. Bourgoin dated Feb. 5, 2009.

*Primary Examiner* — Eric Culbreth
*Assistant Examiner* — Karen Jane A Beck
(74) *Attorney, Agent, or Firm* — Osler, Hoskin & Harcourt LLP

(57) ABSTRACT

A vehicle (10) has a frame (12), at least two wheels (14, 16), a straddle seat (28), a handlebar (18) having first (20) and second (22) handles, an engine (30), a semi-automatic transmission (32), and a housing (24) disposed adjacent the first handle. A shift lever (108) is pivotally connected to the housing. At least a portion of the shift lever extends away from the handle side of the housing towards an end of the first handle and is disposed at least in part vertically below the first handle. The shift lever has rear (140) and front surfaces (142). The shift lever is movable to an up-shift position by pressing one of the front and rear surfaces, is movable to a down-shift position by pressing a remaining one of the front and rear surfaces, and is biased towards a rest position intermediate the up-shift and down-shift positions. The shift lever is operatively connected to the semi-automatic transmission.

19 Claims, 14 Drawing Sheets